(12) United States Patent
Ray et al.

(10) Patent No.: US 6,649,136 B2
(45) Date of Patent: Nov. 18, 2003

(54) METHOD OF CYANIDE SALT PRODUCTION

(76) Inventors: Michael F. Ray, 3811 Swarthmore, Houston, TX (US) 77005; Marcus Rajchel, 12803 West 84th Pl., Arvada, CO (US) 80005

( * ) Notice: Subject to any disclaimer, the term of this patent is extended or adjusted under 35 U.S.C. 154(b) by 223 days.

(21) Appl. No.: 09/819,948

(22) Filed: Mar. 27, 2001

(65) Prior Publication Data

US 2002/0044905 A1 Apr. 18, 2002

Related U.S. Application Data

(60) Provisional application No. 60/192,358, filed on Mar. 27, 2000.

(51) Int. Cl.[7] .................................. C01C 3/08
(52) U.S. Cl. ...................... 423/371; 210/681; 210/683; 423/379
(58) Field of Search .................. 423/371, 379; 210/681, 683

(56) References Cited

U.S. PATENT DOCUMENTS

| | | | |
|---|---|---|---|
| 2,616,782 A | 11/1952 | Cain et al. | |
| 2,708,151 A | 5/1955 | McMinn, Jr. | |
| 2,993,754 A | 7/1961 | Jenks et al. | |
| 3,365,270 A | 1/1968 | Guerin | |
| 3,653,820 A | 4/1972 | Kobs et al. | 23/79 |
| 4,267,159 A | * 5/1981 | Crits | 423/371 |
| 4,321,145 A | * 3/1982 | Carlson | 423/371 |
| 4,708,804 A | * 11/1987 | Coltrinari | 423/371 |

* cited by examiner

Primary Examiner—Wayne A. Langel
(74) Attorney, Agent, or Firm—Greenlee, Winner & Sullivan, P.C.

(57) ABSTRACT

Methods for producing cyanide salts using a metathesis process using ion exchange to facilitate a double-decomposition reaction where components of a cyanide-containing compound are exchanged to produce a cyanide salt product are provided. In one embodiment of the invention, HCN may be converted to an alkali salt using a base. The alkali cyanide salt undergoes ion-exchange to yield the desired cyanide salt product. In another embodiment of the invention, hydrogen cyanide is directly converted to cyanide salts in an ion exchange bed without first being converted to a basic salt.

18 Claims, 11 Drawing Sheets

METHOD OF CYANIDE SALT PRODUCTION

CROSS REFERENCE TO RELATED APPLICATIONS

This application takes priority to U.S. provisional application Ser. No. 60/192,358, filed Mar. 27, 2000, which is incorporated by reference in its entirety to the extent not inconsistent with the disclosure herewith.

BACKGROUND OF THE INVENTION

The invention relates generally to methods and/or apparatuses for production of cyanide salts and by product salts from hydrogen cyanide or Group IA or Group IIA cyanide salts without the use of sodium hydroxide.

Sodium cyanide production has become increasingly important since the late 19$^{th}$ century when a process using cyanide to extract gold and silver from ores was patented. The Beilby process for producing NaCN was predominant in 1891 and produced significant industrial quantities of sodium cyanide until about 1900 when the Castner process superceded it. The Beilby Process consisted of reacting fused carbonates of potassium and sodium with ammonia and carbon:

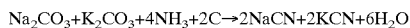

$$Na_2CO_3 + K_2CO_3 + 4NH_3 + 2C \rightarrow 2NaCN + 2KCN + 6H_2O$$

The Castner process produced a much higher purity sodium cyanide product by reacting molten sodium metal with ammonia and charcoal. The process became preferred because reagent costs were reduced (sodium is less expensive than potassium).

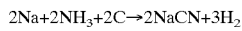

$$2Na + 2NH_3 + 2C \rightarrow 2NaCN + 3H_2$$

Wet processes that react hydrogen cyanide with sodium hydroxide solution superceded both of the above methods. One process (U.S. Pat. No. 2,993,754, Jenks and Linder, Jul. 25, 1961) reports reacting high purity liquid hydrogen cyanide with a concentrated sodium hydroxide solution.

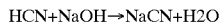

$$HCN + NaOH \rightarrow NaCN + H_2O$$

The resulting solution or slurry from this neutralization can be sold as a solution or evaporated, crystallized, dried, and briquetted. Another process (U.S. Pat. No. 3,619,132, H. J. Mann, Nov. 9, 1971) reports directly absorbing HCN containing gas into a sodium hydroxide solution. The resulting slurry or solution can be evaporated and crystallized. The wet processes represent improvements in reagent costs and product purity from the earlier processes.

There remains a need for a process to produce sodium cyanide or other cyanide salts that does not involve the use of caustic soda (sodium hydroxide) as a reagent.

BRIEF SUMMARY OF THE INVENTION

Provided is a method of preparing sodium cyanide and other Group IA and Group IIA cyanide salts. Generally, there are four main embodiments of the disclosed process. These include a two step process using anion exchangers to metathesize cyanide salts; a two step process using cation exchangers to metathesize cyanide salts; a one step process using anion exchangers to directly metathesize cyanide salts; and a one step process using cation exchangers to directly metathesize cyanide salts. "Two step" processes first convert Group IA or Group IIA cyanide salts, or ammonium cyanide, to an alkali salt using a base such as lime (calcium hydroxide) or other bases, preferably other than NaOH. The subsequent basic cyanide salt is then reacted in an anion or cation exchange apparatus, such that the desired cyanide salt product is formed. "One step" or "single step" processes directly produce cyanide salt products without first being converted to a basic salt.

More specifically, a method is provided of making a compound selected from the group consisting of: Group IA and IIA cyanide salts comprising: (a) contacting a reacting substance comprising cyanide ion and a first exchangeable cation with an ion-exchange media containing a second exchangeable ion wherein either the cyanide ion or the first exchangeable cation exchanges with the second exchangeable ion; and (b) if the cyanide ion is exchanged, contacting the ion-exchange media with a composition selected from the group consisting of: Group IA or IIA metal ions and a third exchangeable ion, wherein the third exchangeable ion is exchanged with cyanide ion and whereby Group IA or IIA cyanide salts are formed; provided that if the first exchangeable cation is exchanged, the second exchangeable ion is a Group IA or Group IIA metal. The method may further comprise the step of reacting said reacting substance with a pre-reacting material which contains one or more Group IA or Group IIA elements or ions, or ammonium, producing a reacting substance comprising cyanide and either ammonium or at least one Group IA or Group IIA element, before contacting said reacting substance with said ion-exchange media.

The reacting substance may be one or more of hydrogen cyanide, Group IA cyanides, Group IIA cyanides, or ammonium cyanide. It is preferred that hydrogen cyanide is the reacting substance. The pre-reacting material is preferably calcium hydroxide or calcium carbonate. The Group IA or Group IIA cyanide salt product is preferably sodium cyanide.

The disclosed process may proceed through anion exchange or cation exchange. In the anion exchange process, hydrogen cyanide or some neutral or alkaline cyanide feed solution comprising cyanide anions and one or more Group IA or Group IIA cations is contacted with an anion exchange media; cyanide anion displaces the anion from the anion exchange media and forms a cyanide loaded ion exchange media; the solution containing the feed cation and the displaced anion that was originally present on the ion exchange media is preferably removed; the cyanide loaded resin is contacted with a solution containing a second cation and an anionic counter-ion which displaces the cyanide, forming a solution containing the second cation and the cyanide ions.

The disclosed process may also proceed through cation exchange. In the cation exchange process, hydrogen cyanide or some neutral or alkaline cyanide salt feed solution comprising cyanide anions and one or more Group IA or Group IIA cations is contacted with a cation exchange media; the Group IA or Group IIA cation displaces the cation from the cation exchange media and forms a Group IA or Group IIA loaded exchange media; and a solution comprising the cyanide anion and the displaced cation from the exchange media is formed. The ion exchange media may be regenerated, as known in the art.

A two-step process using anion exchangers is provided, wherein a cyanide gas or liquid composition comprising one or more Group IA or Group IIA cations is contacted with a basic salt solution having a first exchangeable cation. The first exchangeable cation exchanges with the Group IA or Group IIA cation to form a basic cyanide solution. This solution is contacted with an ion exchange media that is loaded with a first exchangeable anion. Cyanide ions exchange with the first exchangeable anion to form a cyanide-loaded ion exchange media. A solution containing a second exchangeable anion that can exchange with the cyanide ions and a second exchangeable cation that can combine with the cyanide to form a desired salt is contacted with the media. Cyanide is displaced from the media and the desired salt solution is formed.

A two-step process using cation exchangers is also provided, wherein a cyanide liquid or gas composition comprising one or more Group IA or Group IIA cations is contacted with a basic salt solution having a first exchangeable cation. The first exchangeable cation exchanges with the Group IA or Group IIA element to form a basic cyanide solution having the first exchangeable cation. This solution is contacted with an ion exchange media that has a second exchangeable cation. The first exchangeable cation exchanges with the second exchangeable cation, forming a cyanide salt solution comprising cyanide and the second exchangeable cation. The media may be returned to its original state by means known in the art.

A one-step process using anion exchangers is also provided, wherein a cyanide gas or liquid comprising one or more Group IA or Group IIA cations is contacted with an anion exchange media containing a first exchangeable anion. The first exchangeable anion exchanges with the cyanide, forming a cyanide-loaded media. The cyanide is removed from the media, if desired, by contacting the media with a solution containing a second exchangeable anion which exchanges with the cyanide ions and a cation which combines with the cyanide to form a desired salt.

A one-step process using cation exchangers is also provided, wherein a cyanide gas or liquid comprising one or more Group IA or Group IIA cations is contacted with an cation exchange media containing an exchangeable cation. The exchangeable cation exchanges with the Group IA or Group IIA anions, forming a desired cyanide solution. The media may be returned to its original state by methods known in the art.

All reactions occur at conditions (such as temperatures, times and pressures) that allow the desired reactions to proceed (effective conditions). It is well understood that effective conditions depend on the particular apparatus used, and determining all effective conditions is well known to one of ordinary skill in the art without undue experimentation. Other reaction conditions may be any value that allows the desired reactions to occur. Effective conditions may be selected so that the reactions occur with a desired rate, for example. The use and operation of ion-exchange media is well known to one of ordinary skill in the art.

The concentration of reactants in the process may be any effective concentration. The concentration of reactants should be such that undesired reactions do not interfere to such an extent that the desired reaction does not occur to the desired extent or with the desired rate. The cyanide-containing solution or gas that enters the process may have any cyanide concentration up to and including saturated solutions. At least an equal molar amount of pre-reacting material as compared to the amount of reacting substance is preferred so that polymerization of the feed solution is avoided. The loading density of the ion-exchange media (i.e., the amount of exchangeable cation or anion present on the media) depends on many factors which are known to the art, such as the particular composition of the media and the presence or absence of competing anions or cations in the compositions which contact the media. Useful loading densities are those which allow the desired reactions to proceed. The useful loading density may be selected so that the reactions occur with a desired rate. In general, the higher the loading density, the faster the exchange reaction will occur, because the anions do not have to compete for exchange sites. The solutions and gases used in the invention may contain substances other than the anions and cations that are exchanged as long as these substances do not prevent the desired reaction from occurring.

One specific preferred embodiment of a two-step method follows. A method of making a sodium, lithium or potassium cyanide solution comprising: reacting a hydrogen cyanide gas or solution with an at least equal molar amount of calcium hydroxide or calcium carbonate for an effective time and at an effective temperature to produce calcium cyanide; reacting said calcium cyanide with an ion-exchange media containing an first exchangeable anion (preferably chloride) for an effective time and at an effective temperature such that said cyanide is exchanged with said first exchangeable anion; and reacting said media with a composition containing one or more members selected from the group consisting of sodium, lithium or potassium together with a second exchangeable anion (preferably sodium chloride), whereby the second exchangeable anion exchanges with said cyanide, producing a solution comprising cyanide and sodium, lithium or potassium. Although this method describes an anion exchange process, a cation exchange process proceeds in an analogous manner, as described herein.

A preferred embodiment of a one-step method is a method of making a sodium cyanide solution comprising: contacting a hydrogen cyanide solution with a cation exchange media which is sodium loaded, for an effective time and at an effective temperature so that hydrogen exchanges with the sodium cation, producing a sodium cyanide solution. Although this method describes a cation exchange process, an anion exchange process proceeds in an analogous manner, as described herein.

The methods of the invention may be used to prepare desired salts of Group IA and Group IIA elements, as described further herein.

As is well known in the art, many substitutions may be made for the particular chemical substances disclosed herein, as long as the chemical substances perform the same function as those they substitute. For example, potassium chloride may be substituted for sodium chloride. Other substitutions are well known in the art and are encompassed by the disclosure herein. All elements of all Markush groups and other chemical groups disclosed in the invention are included individually and as a group, except those that are known in the art or those that are inoperable. All references cited herein are hereby incorporated by reference to the extent not inconsistent with the disclosure herein.

DETAILED DESCRIPTION OF THE INVENTION

Figure 1:
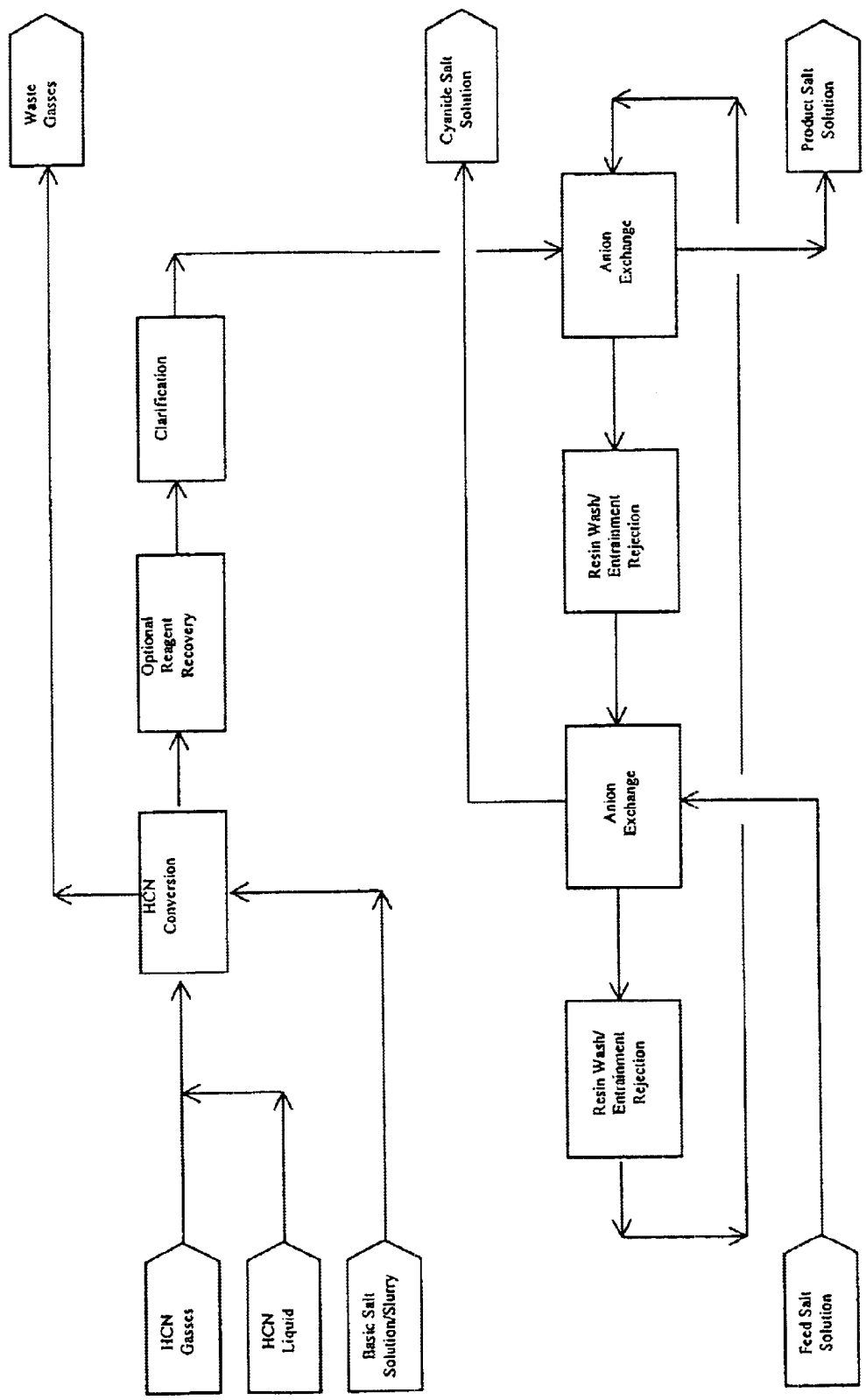
FIG. 1 is a flow chart showing one embodiment of the Two Stage Process Using Anion Exchangers.

As used herein, the following definitions are used: "Ion exchange metathesis" is defined as a chemical process whereby two compounds consisting of cationic species and anionic species are converted to new compounds by exchanging each other's cations and anions. An "anion exchange media" is an ion-exchange media that has a positively charged chemical functional group capable of reversibly bonding with a variety of negatively charged (anionic) species. A "cation exchange media" is an ion-exchange media that has a negatively charged chemical functional group capable of reversibly bonding with a variety of positively charged (cationic) species. "Counter-ions" are anions or cations that may be reversibly absorbed onto a cation or anion exchanger. For example, in water softening applications, calcium is removed by cation exchange with sodium and sodium and calcium are referred to as counter-ions to each other. "Bed volume" is the total volume of some ion exchanger, including both solid volume and interstitial void volume. The abbreviation BV is also used for this phrase. Liquid or gas which fills the interstitial void volume of an ion exchanger is said to be "entrained" with the ion exchanger as the ion exchanger is passed from one operation to another. "Media" when referring to ion-exchange media refers to any substance which allows an exchange of cations or anions which are attached to the media with cations or anions that are contacted with the media. "Media" includes all ion-exchange media that are known to the art that function in the desired manner as described herein, including ion exchange resin. "Exchangeable" when referring to ions refers to an ion that has the ability to exchange with another ion.

The methods of the invention provide a low cost method to produce cyanide salts particularly sodium cyanide. The methods also provide a means to recover dilute byproduct streams of hydrogen cyanide that may not otherwise be economical to recover for sale and produce a marketable product from the stream. The process will work as a batch process, using a fixed bed ion exchanger, for example, or as a continuous process, using a simulated moving bed ion exchange apparatus, for example.

The present invention generally relates to the production of sodium cyanide or other Group IA or Group IIA cyanides by a chemical metathesis process that is facilitated by ion exchange. An example of the method of this invention is the metathesis of sodium chloride and calcium cyanide to form sodium cyanide and calcium chloride. The net reaction is as follows:

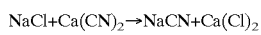

$$NaCl + Ca(CN)_2 \rightarrow NaCN + Ca(Cl)_2$$

The reaction is facilitated through the use of either anion or cation ion-exchange media. The ion-exchange media useful in the invention can be any ion-exchange media that allows the desired reaction to proceed, preferably with the desired rate. Ion-exchange media that are useful in the invention include solid organic or inorganic resins, mineral media (e.g., zeolites), organic or inorganic liquid ion-exchangers, "molecular recognition" media, and non-ionic media that are believed to function using chemisorption or van der Waals forces. The preferred resins include organic resins such as di-vinylbenzene crosslinked polystyrene matrices substituted with sulfonic acid cationic exchange functional groups or tertiary- or quaternary-ammonium anionic exchange functional groups. Use of ion-exchange media is well known in the art, and methods of preparing and exchanging ions from the media are also well known in the art. The particular ion-exchange media used for a particular application and its selection and use are well known in the art.

As described more fully below, calcium chloride is produced as a byproduct of some of the preferred embodiments of the invention. Calcium chloride is commercially valuable for many uses including its use for dust control in the mining industry; as an additive to road-base aggregates (when added during construction, road life is significantly improved); for snowmelt in conjunction with sodium chloride as a replacement for magnesium chloride (currently, Washington state and Idaho mandate its use in road salt mixtures); and a source of calcium as well as chlorides for use in agriculture. Other useful salts are prepared as byproducts of the invention, as will be understood by one of ordinary skill in the art.

The methods of the invention may be used to process cyanide solutions and gases from many sources, including from Andrussow reactors, from BMA reactors, from the fluhomic cyanide process, from acrylonitrile production, from coke-ovens, as well as other sources.

Various apparatuses may be used to carry out the invention. These include "simulated moving bed" ion-exchange equipment, actual moving bed ion-exchange equipment, batch ion-exchange equipment, liquid—liquid ion-exchange equipment, and "molecular recognition" ion encapsulation equipment. The particular apparatus chosen is well within one of ordinary skill in the art, with consideration to the particular process conditions such as amount of reactants, amount of products desired, time of reaction desired, safety, and other considerations. The process steps of the methods may include steps such as washing and draining, if desired. The use and need for these steps is well within one of ordinary skill in the art.

Some advantages of the disclosed processes over currently available processes for making sodium cyanide and other cyanide salts are discussed below. First, the method eliminates the need for sodium hydroxide in converting HCN to NaCN. Sodium hydroxide is an expensive base. On a hydroxide equivalent basis, NaOH is generally more than 10 times the cost of lime, the least expensive base. In the disclosed processes, basic salts, such as but not limited to sodium bicarbonate and potassium hydroxide, or any basic salt which can raise the pH of the solution to a level that can be used to neutralize HCN prior to ion-exchange, preferably a pH of above about 10.0. Also, process steps involved in the catalytic conversion of methane (or propane) and ammonia to HCN by Andrussow/BMA-type HCN production processes can be eliminated using the disclosed process. For example, the Andrussow/BMA processes could eliminate all the normal gas processing steps up to (but not including) the waste heat boiler. If polymerization of HCN can be prevented, the off-gasses from the ammonia methane reactor can be directly absorbed into a caustic solution, and sent directly to ion exchange. Further, valuable and environmentally friendly co-product salts are produced by the process of this invention. In one embodiment, calcium cyanide and sodium chloride are converted by the process of this invention to produce sodium cyanide and calcium chloride, which are more valuable than the reagent salts. Under certain process conditions, especially in processes where the feed cyanide is contaminated with ammonia, the contaminated hydrogen cyanide may be directly absorbed into cold lime slurry/solution instead of flaring or deep well injecting as a means of disposal. In addition, cyanide and co-product salts produced by the method of this invention will require less energy to produce than by conventional means since they will require less evaporation because concentrated elutant solutions can be prepared to remove absorbed species from ion-exchange resins. As a result, under some conditions, solutions that are at or close to saturation can be prepared.

All processes disclosed herein can be used in a continuous process, or in batch mode, with modifications well known to one of ordinary skill in the art.

Although Applicants do not wish to be bound by the theory presented herein, the following description may aid in the understanding and use of particular preferred embodiments of the invention. The following description is intended only for illustration and should not be construed as limiting the scope of the invention in any way.

Two-Step Processes

I. Two Step Process Using Anion Exchangers to Metathesize Basic Cyanide Salts

Figure 5:
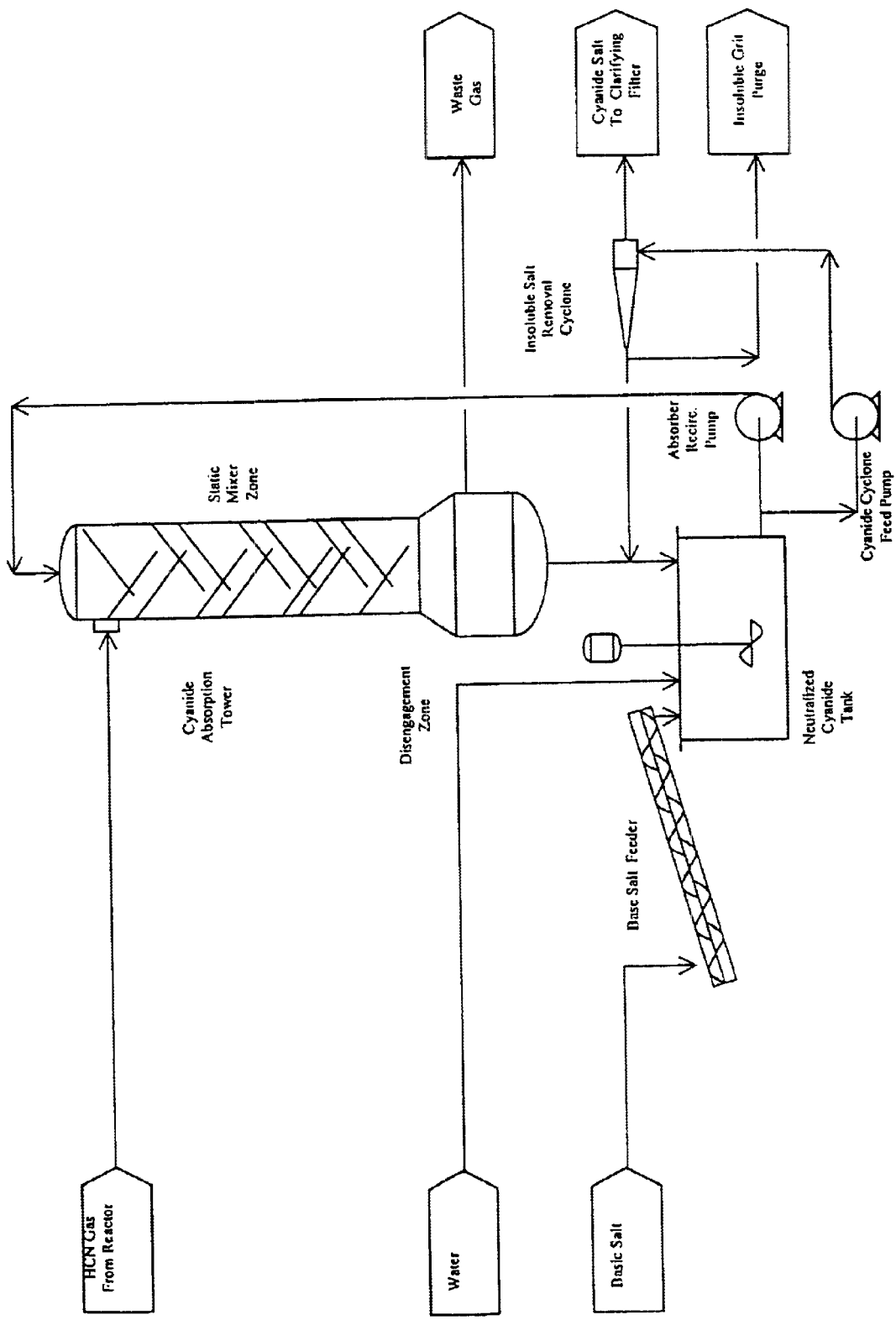
FIG. 5 is a flow chart representing one type of gas-slurry contact equipment that can be used to absorb hydrogen cyanide gas into a lime slurry.

FIG. 1 is a flow chart that describes the general two-step process using anion exchangers. The process sketch in FIG. 5 shows a specific preferred embodiment of the two-step process using anion exchangers.

Hydrogen cyanide, either gas, pure liquid, or in solution with other substances is combined with an equal-molar (or excess molar) quantity of some basic salt in a reaction vessel. The hydrogen cyanide may come from any source, including a catalytic HCN reactor or from an acrylonitrile waste gas. The basic salt is preferably a Ca(OH)$_2$ (lime) slurry. Limestone (calcium carbonate) may also be used, as can any other soluble alkali material.

HCN is converted to calcium cyanide, Ca(CN)$_2$ by the following reaction:

$$2HCN + Ca(OH)_2 \rightarrow Ca(CN)_2 + 2H_2O$$

Those skilled in the area of gas-liquid contact equipment will recognize that numerous types of existing gas-liquid contact equipment could be used to achieve the conversion of HCN to alkali metal cyanide. The absorption tower depicted in FIG. 5 uses standard static mixer technology and is just one of many possible configurations and is shown for purposes of illustration only. The waste gases, containing mostly nitrogen, carbon dioxide and oxygen are separated from the calcium cyanide/lime mixture and burned in a flame or other thermal oxidizer as necessary or desired.

Excess undissolved lime and insoluble grit may be removed from the mixture by any of a number of solid-liquid separation technologies including, but not limited to hydrocyclones (as shown in FIG. 5), filters, thickeners and centrifuges. The unconverted lime may be re-circulated back to the previous step. The solution is preferably clarified prior to entering ion exchange beds to remove particles of lime and lime insoluble matter (grit).

Alkali cyanide solution is pumped through a countercurrent flow of counter-ion-form ion-exchange resin. The anion can be Cl$^-$, F$^-$, Br$^-$, I$^-$, formate, or any other anion which is exchangeable with cyanide. Cyanide ions displace the resin's counter ion (e.g., chloride) according to the following:

$$2R\text{---}Cl + Ca^{++} + 2CN^- \rightarrow 2R\text{---}CN + CaCl_2$$

where R—Cl and R—CN refers to the ion-exchange-resin-to-chloride or cyanide species and the resin becomes loaded with cyanide anions. The resin can be either strong-base or weak-base anion resin. The resin may be rinsed at this point. In the case of the calcium cyanide solution/chloride-form resin, calcium chloride solution, a valuable co-product leaves the column for direct sale or further processing.

Those skilled in the art will recognize the counter-current flow of resin and solution assures high purity resin and solutions species. Counter-current methods are preferred, but other methods of contacting the resin with solution may be used, as known in the art. Simulated moving bed ion-exchange equipment is commercially available.

The solution leaving the resin, which is nearly depleted of cyanide ions, depending on the amount of exchange that occurs, will contact regenerated counter-ion form resin in a simulated moving-bed system.

After the cyanide is captured from solution by the ion-exchange resin, cyanide is stripped from the resin using a solution in any concentration up to saturation of some alkali metal-counterion salt. In a preferred configuration, sodium chloride is used to supply the counter ion to displace cyanide. Any of the base-metal halides could be used, including for example, NaX, LiX, KX, where X is Cl, F, Br, or I. For example when sodium chloride (NaCl) is used, ion exchange proceeds according to the following reaction:

$$R\text{---}CN + Na^+ + Cl^- \rightarrow R\text{---}Cl + NaCN$$

In this case, high purity sodium cyanide solution leaves the resin for standard downstream processing. After sufficient contact with the Feed Salt solution, the resin is advanced to the Resin Wash/Entrainment Rejection section of the ion-exchange apparatus. The resin, as a result of elution with the counter ion, is regenerated and is advanced back to the cyanide absorption section of the ion-exchange equipment.

Example Process: Two Step Process: Method Using Anion Exchangers

This specific embodiment of the invention converts HCN solutions into NaCN solutions using a two-step process whereby HCN is first converted to Ca(CN)$_2$ using a lime slurry reagent followed by ion-exchange metathesis using anion exchangers. Calcium leaves the process as calcium chloride solution.

Figure 6:
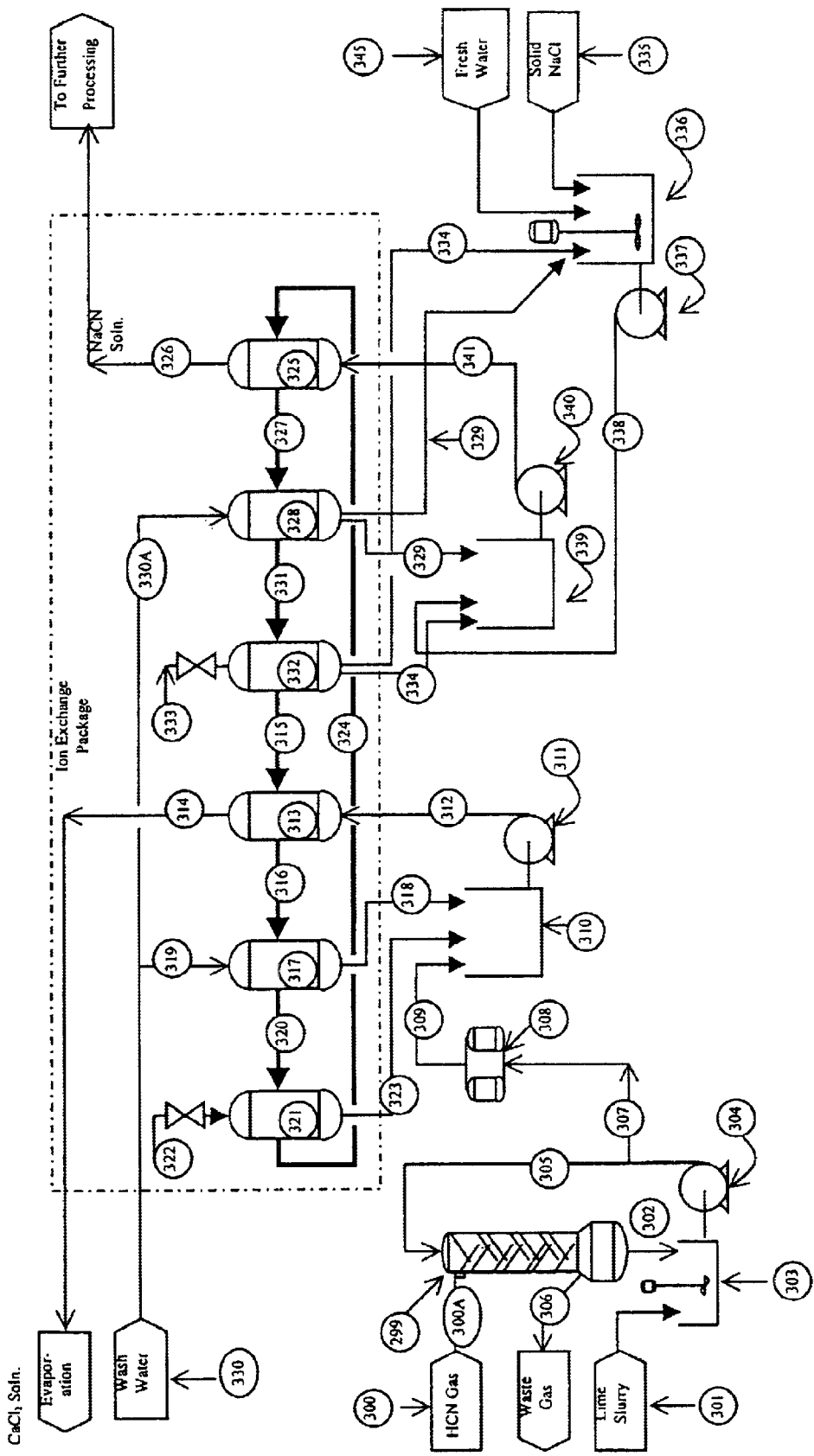
FIG. 6 is an embodiment of the Two-Step Process using Simulated Moving Bed (SMB) ion exchange equipment using Anion Exchangers.

Refer to the process flow diagram in FIG. 6. The process will accept hydrogen cyanide from any source. Although any HCN concentration is acceptable, it is preferred that HCN is received as an aqueous solution or in the gaseous state. It can be received, for example, as: dilute, HCN-water solution from an Andrussow- or BMA type HCN absorber; HCN gas from HCN gas generators such as Andrussow or BMA type reactors or coke ovens, or any of a number of other such generators; or by-product HCN recovered from acrylonitrile plants. One advantage to receipt of dilute HCN solution is that some unit operations from the HCN production process may be eliminated and thus capital costs reduced.

A. Lime Conversion

In the embodiment provided in this example, HCN gas (300) is introduced into the Lime-HCN Absorber (299) via conduit 300A. Lime slurry and/or solution (301) is circulated through the tower via pump 304 and conduit 305 where it comes in contact with the HCN-containing gas. Calcium cyanide solution/lime slurry mixture leaves the absorber via conduit (302) concentrations ranging from zero weight percent to saturation and is received into (303), the Lime Conversion Tank. Waste gases are transferred out of the absorber via conduit 306. The lime slurry or solids are introduced to the tank in a slight excess. HCN is converted according to:

$$2HCN + Ca(OH)_2 \rightarrow Ca(CN)_2 + 2H_2O \qquad (1)$$

The reaction proceeds to completion as long as a sufficient excess of lime is added. If there is not an excess of lime, polymerization of HCN may occur, fouling the process. The pH is preferably held above 10.5 to avoid the hazards associated with volatilization of hydrogen cyanide according to:

$$Ca(CN)_2 + H_2O \rightarrow Ca(CN)(OH) + HCN \qquad (2)$$

When conversion is complete, the solution will no longer present a respiratory hazard.

Lime conversion may be carried out in any of a number of different reactor configurations including but not limited to:
a. Absorption Towers
b. Continuously Stirred Tank Reactors
c. Plug-Flow (Tubular) Reactor
d. Pebble Lime Bed The solution leaves the absorber apparatus via conduit (307) and may be transferred into clarifier (308) to remove undissolved lime and insoluble lime grit. Depending upon the lime conversion method used and the clarity of the HCN feed, the step may utilize any of a number of standard clarification unit operations including: hydrocyclones, thickeners, belt filters, and centrifuges.

The solution is transferred from the clarifier via conduit (309) to the $Ca(CN)_2$ Feed Tank (310). Other ion exchange wash and drain streams, which are described below, are also fed to this tank via conduits 318 and 323. The combined feed solution is pumped via pump (311) through conduit (312) to the cyanide loading section (313) of the ion-exchange equipment

B. Ion Exchange

The process described herein relates to the use of anion exchangers. The system depicted in FIG. 6 represents a simulated moving bed (SMB) ion-exchanger.

Anion exchangers are preferred when dilute solutions of cyanide are to be concentrated. When a dilute solute is absorbed onto a resin it can be then eluted with a concentrated elutant to produce a concentrated cyanide salt.

Calcium cyanide is, to all practical extents, fully ionized in water and is highly soluble in water.

Feed solution is pumped (via pump 311) to the Ion Exchange Equipment via conduit 312. The system depicted is generic. Any number of commercially available or custom systems may be used. The preferred embodiment utilizes a simulated moving bed system.

The features of the illustrated embodiment include:
a. A Cyanide Loading (CN Absorption) Section
b. An Elution Section (CN Desorption)
c. The feed and elutant solutions flow counter-currently to the net resin flow.
d. There are usually multiple stages of resin beds for both absorption and elution.

Those of ordinary skill in the art will recognize that resin entrainment rejection (317) of the resin bed void solution, and washing steps, although not essential features of the invention, are part of the preferred design and are included in this description.

The following steps describe the Ion Exchange operation within the process.

1. Loading (CN Absorption)

The loading section (313) consists of one or several stages of resin beds which are generally advanced sequentially in a direction opposite to the feed solution flow. Feed solution is introduced to the "lead" column or resin bed through conduit (312). Fresh (regenerated) resin is introduced at the "tail" column through conduit (315).

Regenerated resin is in the chloride-form and converted to the cyano-form in the "Lead" resin bed by the following reaction:

$$R-Cl + CN^- \rightarrow R-CN + Cl^- \qquad (3)$$

Cyanide-loaded resin will be unaffected by cyanide solution passing through it as it advances through the loading section:

$$R-CN + CN^- \rightarrow R-CN + CN^- \qquad (4)$$

At the tail end of the advancing resin, regenerated, chloride-form resin will enter the loading section and come in contact with the exiting, displaced chloride ions:

$$R-Cl + Cl^- \rightarrow R-Cl + Cl^- \qquad (5)$$

In the middle columns of the loading section, some cyanide will be desorbed and replaced by chloride by reactions known in the art:

$$R-CN + Cl^- \rightarrow R-Cl + CN^- \qquad (6)$$

Since fresh, regenerated resin enters the loading section at the point of exit for the feed solution, equations (3) and (5) will prevail.

At the lead column, the most concentrated cyanide solution contacts resin with the lowest concentration of available resin sites (i.e., R—Cl). Since solutes are continuously removed from the advancing bed and fresh cyanide solution is continuously introduced, the equilibrium of Reaction (3) is forced toward the products (i.e. R—CN).

Loaded resin in the lead column is the least affected since there are essentially no chloride sites remaining to exchange with the pure cyanide solution. That is, Reaction (4), in which nothing happens, predominates.

At the Tail column of the Loading Section, depleted solution, containing both cyanide and (desorbed) chloride ions, enters the bed which is substantially in the chloride-form. Reaction (5), in which nothing essentially happens, and Reaction (3) both occur. Because of the high concentration of available of R—Cl, (3) is favored.

Cyanide break-through is defined as cyanide ion which pass through the Loading Section without being absorbed by the resin. Cyanide can break-through according to Reaction (6). The concentration of cyanide in the cyanide loading section effluent can be made as small as desired adjusting:
a. Feed solution flow.
  If the feed solution flow, at a given concentration and resin advance rate, is too high, break-through losses can occur.

b. Feed solution concentration

If the feed solution concentration is too high for a given solution flow and resin advance rate, break-through losses can occur.

c. Resin advance rate

If the resin advance rate is too low, break-through losses can occur.

d. Length (volume) of Loading Section

Adding stages of resin beds, for a given flow rate reduces break-through losses.

A certain amount of cyanide break through may occur either by design or operator error. For any cyanide break-through that occurs, a suitable oxidant can be added to the $CaCl_2$ effluent from the Loading Section to convert cyanide ions to relatively harmless calcium cyanate.

2. Loaded Resin Wash

The resin leaving the loading section via transfer 316 will be in contact with solution with substantially the same composition as the feed solution (i.e., $Ca[CN]_2$). Therefore, this liquor will be routed back to the $Ca(CN)_2$ Feed Tank (310) via conduit 318.

After the resin has left the loading section, it can be washed with fresh water via conduit (319) counter-current to the direction of feed solution flow. The purpose of this wash is to displace the interstitial feed solution from the resin bed and allow the pore contained feed solutes to diffuse out of the resin.

The mechanism for the wash step will be both displacement (i.e., the interstitial solution) and diffusional (i.e., the pore-contained liquor) and therefore, the wash ratio should be purposefully small. It is recommended that sufficient time for diffusion of the solutes out of the resin be provided so that the final product will have acceptable purity with respect to calcium content.

The resin retains solution in two ways:

a. Voids Between Resin Particles:

Solution is retained in the interstices of the resin bed. For spherical particles, this volume is about 35–40% of the bed volume.

b. Resin Particle Pore-Contained Liquor:

Solution is retained in the pore volume of individual beads. For many resins, the volume of pores in an individual bead is on the order of 40–50%.

Displacement washing is accomplished by simply pumping fresh water through the bed at a rate sufficient to displace the solution in the bed voids. Pore contained solution removal is time dependent upon concentration gradient between the pore contained solution, the diffusion coefficient, bead diameter, and bead density.

Low flow counter current wash water, on the order of 1–3 bed-volumes of resin per bed-volume of resin advanced should be sufficient. The length of the wash zone is dictated by the requirements to remove pore solution, which will be small in most cases.

3. Loaded Resin Drain

In some cases, draining the resin bed to rid it of the diluted interstitial feed liquor is desirable. Resin leaving the wash zone via transfer 320 would then enter a Drain Zone (321). Since this solution exiting the drain zone via conduit (323) will have a small amount of $Ca(CN)_2$, it is preferably routed back to the feed tank (310). In most cases, to facilitate resin draining, the top of the column may be opened to the atmosphere via valve 322. The resin will then be advanced via transfer (324) to the Cyanide Elution Section (325) of the ion exchange apparatus.

4. Elution

Cyanide on the loaded resin will be eluted (i.e., removed) using a strong solution of sodium chloride.

Sodium chloride, either solid or aqueous, (335) can be mixed with either or both fresh water (345) and/or Elution Wash Liquor (334) in the Elutant Mix Tank (336). The NaCl elutant concentration can be any concentration up to saturated solutions.

The elutant is pumped to the Elutant Feed Tank (339) through conduit 338 by the Elutant Mix Pump (337). Elutant from the Elutant Feed Tank is fed counter-current to the net flow of resin by the Elutant Feed Pump (340) via conduit 341.

The resin reaction of interest is Reaction (6):

$$R\text{—}CN + Cl^- \rightarrow R\text{—}Cl + CN^- \tag{6}$$

Similar to Cyanide Loading, the elution shall be operated with solution flowing counter-current to the advance of resin. The resin with which the chloride elutant is contacted will be the resin which is about to leave the Elution Section of the ion exchanger. At the point where sodium chloride elutant is introduced, the resin will have been in contact with the elutant for the longest time and will be nearly exhausted of cyanide. Since the highest concentration chloride solution contacts the resin which is most regenerated, the cyanide content of resin leaving the loading section will be primarily in the chloride form.

Similarly, sodium cyanide solution leaving the Elution section of the Ion Exchange apparatus will be in contact with resin which is in the cyanide form (i.e., and as such will have essentially no R—Cl). Any chloride still present in solution at this point in the process will encounter an overwhelming concentration of cyanide form resin and will exchange according to Reaction (6).

5. Eluted Resin Entrainment Rejection and Wash

Resin leaving the Elution Section via transfer (327) enters the Entrainment Rejection/Wash Section (328) of the ion exchange apparatus. The Eluted Resin Wash operation has goals similar to that of the "Loaded Resin Wash" operation. The solution leaving the column in the Entrainment Rejection section will consist primarily of NaCl elutant. Wash water (330) transferred via conduit 330A will enter the column and will push the solution retained in the column into either the Elutant Mix Tank (336) or the Elutant Feed Tank (339) via conduit 329.

6. Eluted Resin Drain

Before advancing to the Resin Loading section of the ion exchange plant, the resin may be advanced via transfer (331) to an Eluted Resin Drain section (332) of the ion exchange apparatus, be drained of the wash liquor which transfers via conduit (334) to 336 or 339 by admitting air or inert gas through valve (333). Similar to the Loaded Resin Drain (321), the liquor should consist mainly of water and will be directed back to either the Elutant Feed Tank (339) or Elutant Mix Tank (336), depending upon the water needs of the process. This step is optional, depending upon the purity of products required.

After Entrainment Rejection, Wash, and Drain, the resin will be advanced via transfer (315) back to the Cyanide Loading Section of the Ion Exchange Apparatus (313).

The sodium cyanide product can leave the process via conduit 326 and the calcium chloride product can leave the process via conduit 314 for further processing, if desired.

II. Two Step Process Using Cation Exchangers to Metathesize Basic Cyanide Salts

Figure 2:
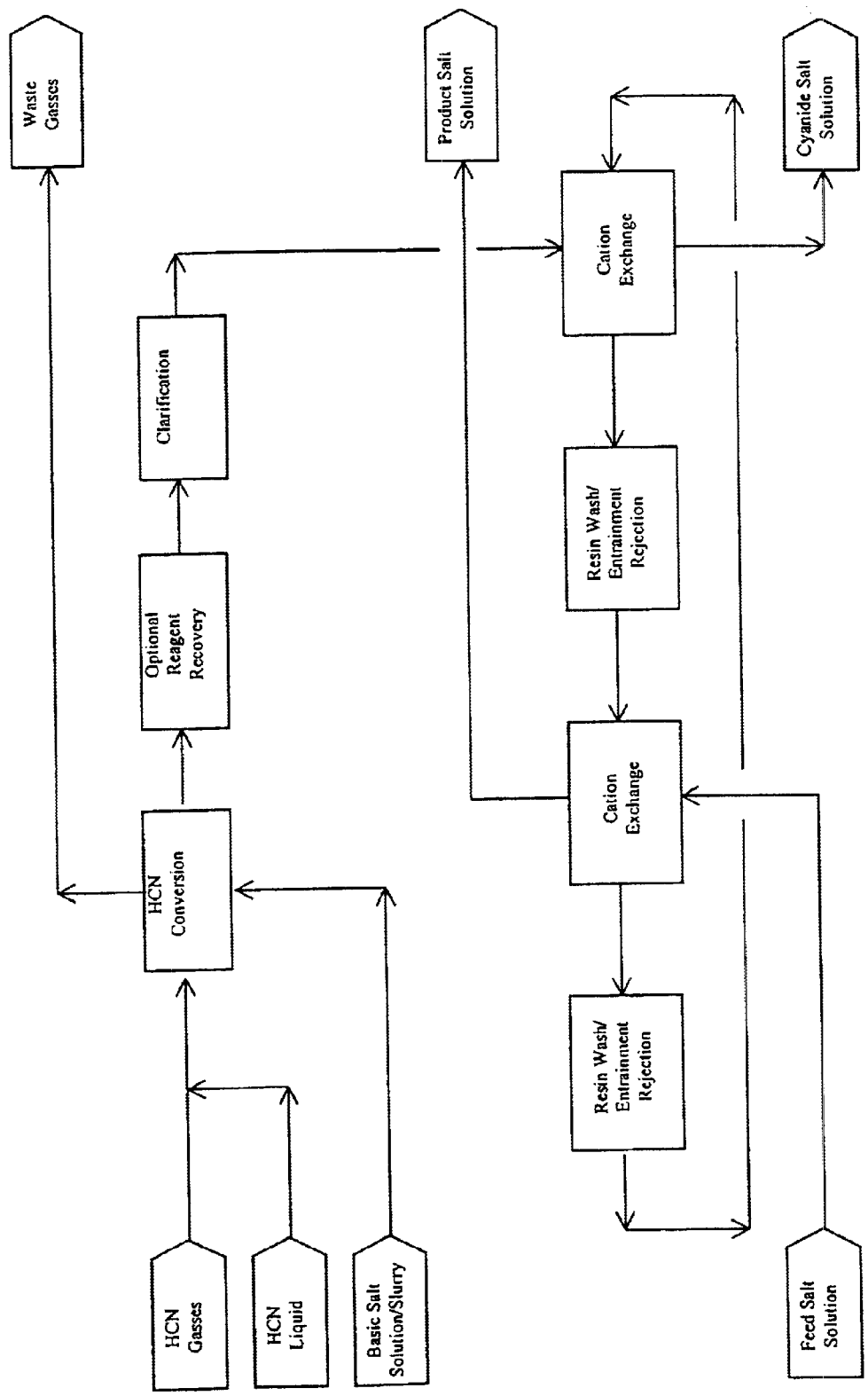
FIG. 2 is flow chart showing one embodiment of the Two Stage Process Using Cation Exchangers.

FIG. 2 is a flow chart that describes the general two step process using cation exchangers to metathesize basic cyanide salts.

1. Conversion of Hydrogen Cyanide to Calcium Cyanide or Other Basic Cyanide Salts Hydrogen cyanide, either gas, pure liquid, or in solution is combined with an equal-molar (or an excess molar) quantity of some basic salt in a reaction vessel. This process is as described above. Excess basic salt may be removed from the mixture, as described above. The cyanide salt solution may be processed to give a clarified stream of cyanide salt solution, as described above.

2. Absorption of $Ca(CN)_2$ on Ion Exchange Resin

The cyanide solution from the previous step flows preferably counter currently to a cation exchange resin that has been prepared in a preferably sodium, potassium, or lithium-form. For example, calcium ions displace the resin's counter ion (e.g., sodium) and the resin becomes loaded with the counter ion before exiting the loading zone. Calcium ions, having a great affinity relative to sodium are absorbed onto the resin, displacing sodium. The effluent solution will be a high purity sodium cyanide solution according to:

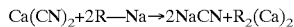
$$Ca(CN)_2 + 2R\text{—}Na \rightarrow 2NaCN + R_2(Ca)_2$$

The resin may be drained of the counter ion-containing solution in the Resin Wash and Entrainment Rejection portion of the ion exchange equipment. The resin can be rinsed to eliminate traces of the counter ion more completely. The resin is advanced to the next step in the ion exchange operation where the resin will be returned to its previous form.

3. Elution of NaCN Using Sodium Chloride

Resin entering the Elution Section will be loaded with absorbed Calcium. A solution of some soluble salt, containing the counter-ion to the absorbed counter-ion, is contacted with the resin according to the following:

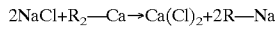
$$2NaCl + R_2\text{—}Ca \rightarrow Ca(Cl)_2 + 2R\text{—}Na$$

In a preferred configuration, sodium chloride is used to supply the counter ion to displace calcium. Sodium and calcium are the counter ions to each other to be exchanged in the metathesis process of this invention. The soluble salt is not limited to NaCl. Any of the base-metal halides could be used, including for example, NaX, KX, LiX, were X is Cl, F, Br or I. The resulting solution contains the soluble salt's anion and the desorbed cation. In the case of a NaCl elutant, the resulting solution is calcium chloride, $CaCl_2$. After sufficient contact with the Feed Salt solution, the resin is advanced to the Resin Wash/Entrainment Rejection section of the ion exchange apparatus. The resin, as a result of elution with the counter cation, is regenerated and is advanced back to the calcium absorption section of the ion exchange equipment.

Since most cationic resins have a higher total exchange capacity (TEC) than a corresponding anion resin, the effluent calcium chloride solution could be produced in a much higher concentration than from processes using anion exchangers.

Example Process: Two Step Process: Method Using Cation Exchangers

This specific embodiment of the method of this invention converts HCN solutions into NaCN solutions using a two-step process whereby HCN is first converted to $Ca(CN)_2$ using a lime slurry reagent followed by ion exchange metathesis using anion exchangers. Calcium leaves the process as calcium chloride solution.

Figure 7:
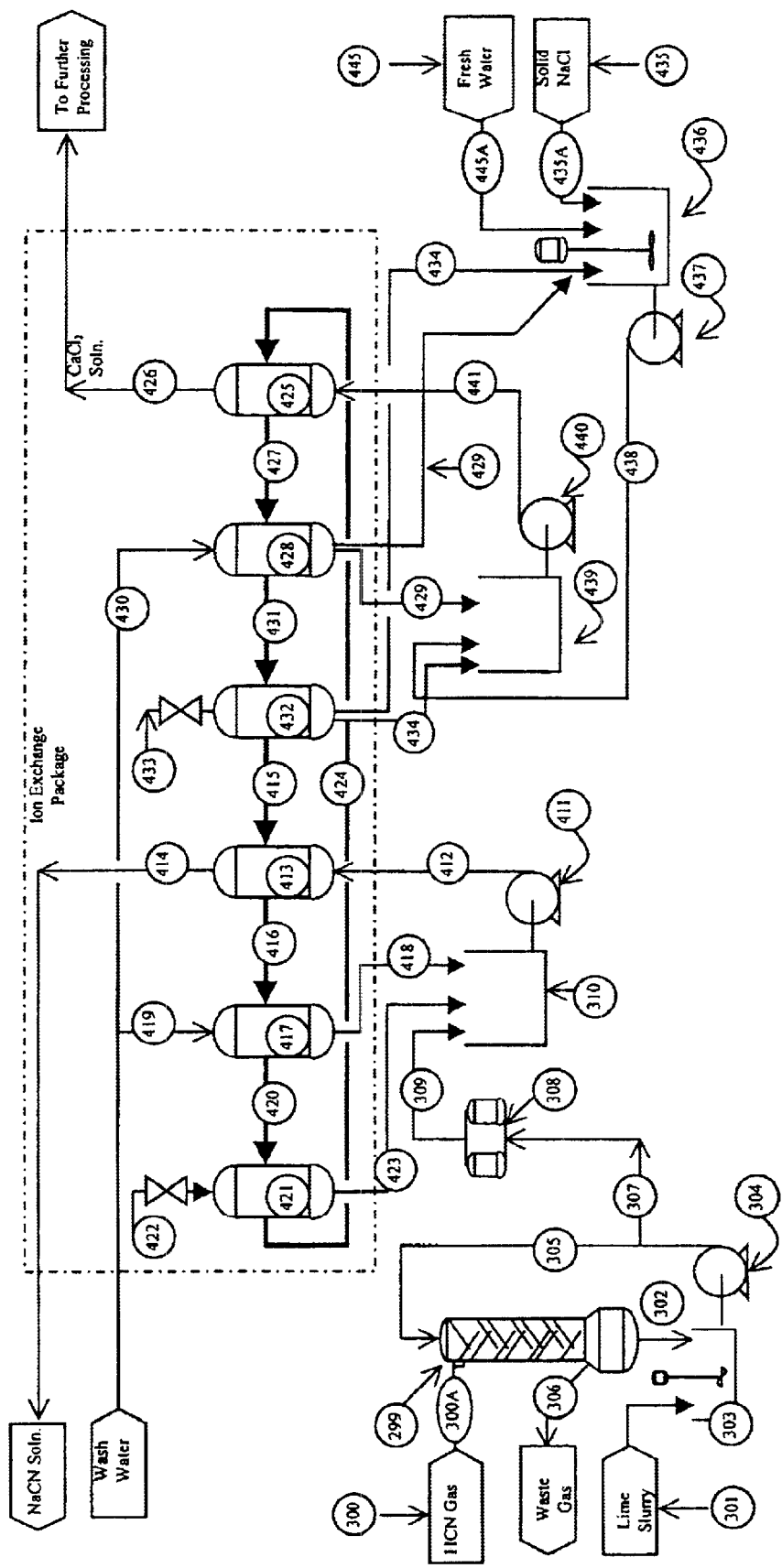
FIG. 7 is an embodiment of the Two-Step Process using Simulated Moving Bed (SMB) ion exchange equipment using Cation Exchangers.

Refer to the process flow diagram in FIG. 7. The process will accept hydrogen cyanide from any source, as described elsewhere.

A. Lime Conversion

The first step, lime conversion of HCN to $Ca(CN)_2$, is depicted in items 399 to 409, and is identical to that described in "Example Process: Two Step Process: Method using Anion Exchangers" above.

B. Ion Exchange

The process described herein relates to the use of cation exchangers. The system depicted in FIG. 7 represents a simulated moving bed (SMB) ion exchanger.

Cation exchangers generally have a higher total exchange capacity (TEC) as compared to anion exchangers and therefore have a greater potential to produce more concentrated co-product salt solutions. For example, when a dilute solution of calcium cyanide is absorbed onto a cation exchanger it can be then eluted with a concentrated sodium chloride elutant to produce a concentrated calcium chloride salt.

Feed solution is pumped via pump (411) to the Ion Exchange Equipment via conduit 412. The system depicted is generic and other embodiments are useful, as known in the art.

The features of the illustrated embodiment include:
a. A Cation Loading (e.g., Calcium Absorption) Section
b. An Elution Section (e.g., Calcium Desorption/Sodium Absorption)
c. The feed and elutant solutions flow counter-currently to the net resin flow.
d. There are usually multiple stages of resin beds for both absorption and elution.

Those of ordinary skill in the art will recognize that resin entrainment rejection (417) of the resin bed void solution and washing are part of the preferred design and are included in this description.

The following steps describe the Ion Exchange operation within the process.

1. Loading ($Ca^{++}$ Absorption)

The loading section (413) will consist of one or several stages of resin beds which are generally advanced sequentially in a direction opposite to the feed solution flow. Feed solution is introduced to the "lead" column or resin bed via conduit (412). Fresh (regenerated) resin is introduced at the "tail" column via transfer (415).

Regenerated cation exchanger shall be in the sodium-form and converted to the calcium-form in the "Lead" resin bed according to the following:

$$2R\text{—}Na + Ca^{++} \rightarrow R_2\text{—}Ca + 2Na^+ \qquad (7)$$

Similar to the operation described above in (II) regarding the process with anion exchangers, the Two-Step Process using cation exchangers preferably utilizes counter current column operations to provide a pure NaCN metathesis product.

2. Loaded Resin Wash

The resin leaving the loading section via transfer 416 will be in contact with solution with substantially the same composition as the feed solution (i.e., $Ca[CN]_2$). Therefore, this liquor transferred via conduit (418) will be routed back to the $Ca(CN)_2$ Feed Tank (410).

After the resin has left the loading section, it can be washed with fresh water transferred via conduit (419) counter-current to the direction of feed solution flow. The purpose of this wash is to displace the interstitial feed solution from the resin bed and allow the pore contained feed solutes to diffuse out of the resin.

The mechanism for the wash step is the same as process described for the Two-Step Process using anion exchanger above. Displacement washing is accomplished by simply pumping fresh water through the bed at a rate sufficient to displace the solution in the bed voids. Pore contained solution removal is time dependent upon concentration gradient between the pore contained solution, the diffusion coefficient, bead diameter, and bead density.

Low flow counter current wash water, on the order of 1–3 bed-volumes of resin per bed-volume of resin advanced should be sufficient. The length of the wash zone is dictated by the requirements to remove pore solution, which will be small in most cases.

3. Loaded Resin Drain

In some cases, draining the resin bed to rid it of the diluted interstitial feed liquor is desirable. Resin leaving the wash zone via transfer 420 enters a Drain Zone (421). Since the drain solution leaving the drain zone via conduit (423) will have a small amount of Ca(CN)$_2$, it also is routed back to the feed tank (410). In most cases, to facilitate resin draining, the top of the column may be opened to the atmosphere via vent (422). The resin is advanced via transfer (424) to the Sodium Loading/Calcium Elution Section (425) of the ion exchange apparatus.

4. Elution

Calcium absorbed onto loaded resin will be displaced using a strong solution of sodium chloride.

Sodium chloride (435), either solid or aqueous, via conduit (435A) can be mixed with either or both fresh water (445) via conduit 445A and/or Elution Wash Liquor via conduit (434) in the Elutant Mix Tank (436). The NaCl elutant can range from dilute to saturated solutions.

The elutant will be pumped to the Elutant Feed Tank (439) by the Elutant Mix Pump (437) via conduit 438. Elutant from the Elutant Feed Tank is fed counter-current to the net flow of resin by the Elutant Feed Pump (440) via conduit 441.

The resin reaction of interest is Reaction8):

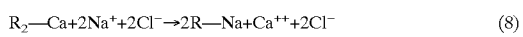  (8)

Similar to the Calcium Loading section, the elution shall be operated with solution flowing counter-current to the advance of resin. Counter-current column operation allows for a high purity calcium chloride product to leave the Calcium Elution (Sodium Loading) section of the ion exchanger.

Because the elutant sodium chloride can be introduced as a concentrated solution, the calcium chloride solution leaving the ion exchanger can also be concentrated up to the maximum for the given ion exchange media.

5. Eluted Resin Entrainment Rejection and Wash

Resin leaving the Elution Section via transfer (427) will enter the Entrainment Rejection/Wash Section (428) of the ion exchange apparatus. The eluted resin wash operation has goals similar to that of the "Loaded Resin Wash" operation. The solution leaving the column in the Entrainment Rejection section will consist primarily of NaCl elutant. Wash water will enter the column via conduit 430 and will push the solution retained in the column into either the Elutant Mix Tank (436) or the Elutant Feed Tank (439) via conduit 429.

6. Eluted Resin Drain

Before advancing to the Resin Loading section of the ion exchange plant, the resin may be advanced via transfer (431) to an Eluted Resin Drain section (432) of the ion exchange apparatus, be drained of the wash liquor via conduit (434) by admitting air or inert gas via vent (433). Similar to the Loaded Resin Drain, the liquor should consist mainly of water and will be directed back to either the Elutant Feed Tank (439) or Elutant Mix Tank (436), depending upon the water needs of the process.

This step is optional, depending upon the purity of products required.

After Entrainment Rejection, Wash, and Drain, the resin is advanced via transfer (415) back to the Calcium Loading Section of the Ion Exchange Apparatus.

The sodium cyanide product can leave the process via conduit 414 and the calcium chloride product can leave the process via conduit 426 for further processing, if desired.

Single Step Process

In the single step process example, a metathesis reaction also occurs as it does for the "Two Step Process", except that acid protons from hydrogen cyanide are directly exchanged for sodium such that the products are sodium cyanide and hydrochloric acid.

III. One Step Process Using Anion Exchangers to Directly Metathesize HCN

Figure 3:
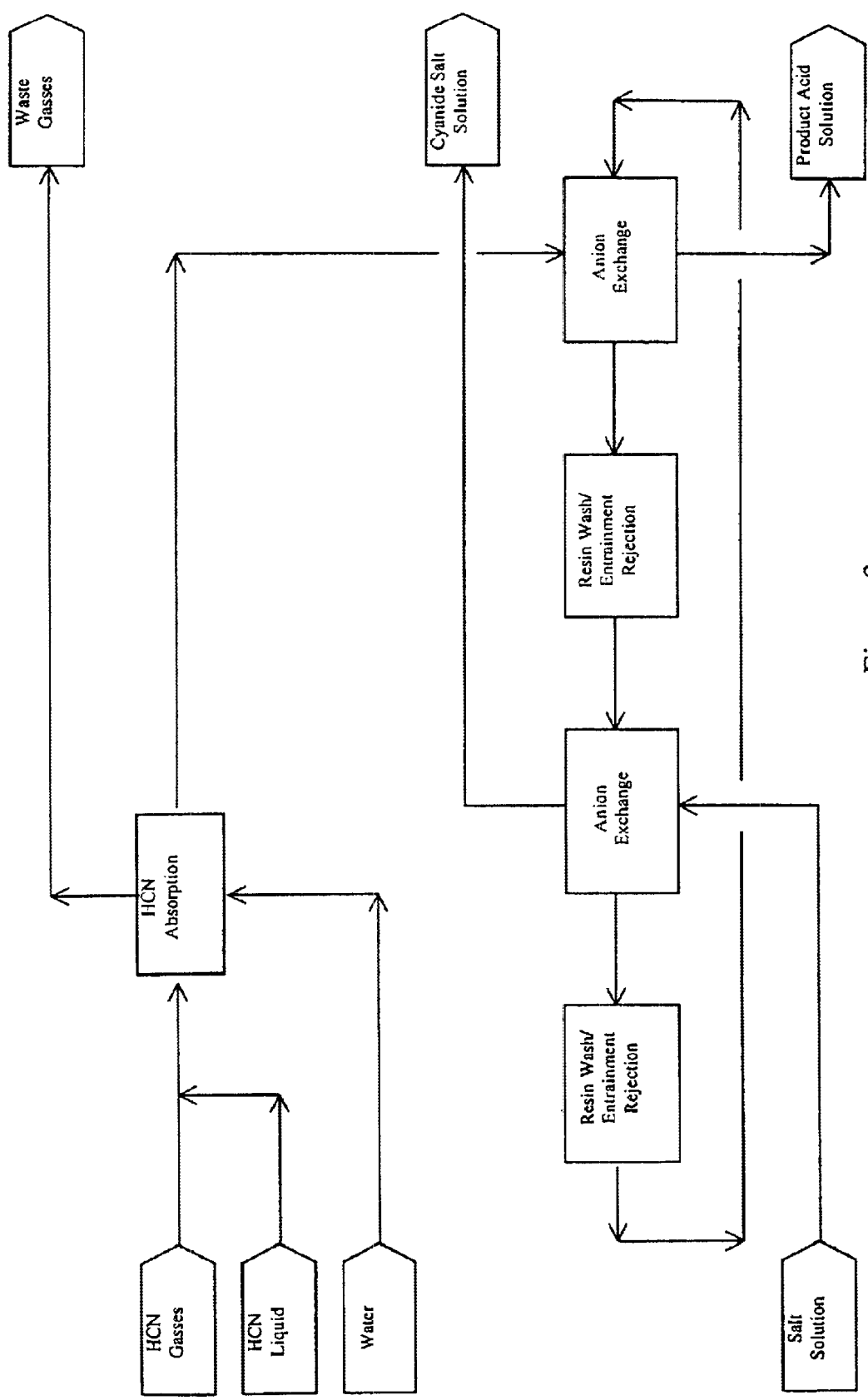
FIG. 3 is a flow chart showing one embodiment of the Single Stage Process Using Anion Exchangers.

FIG. 3 is a flow chart that describes the method of the one step process using anion exchangers.

Hydrogen cyanide, either gaseous or liquid, may be absorbed or mixed with water in any standard absorption/mixing device. The system should be operated at as high a pressure as practical in order to achieve the highest possible HCN concentration in solution. The HCN solution is then transferred to the ion exchange equipment. The HCN-stripped gasses may be vented, flared, or used as a fuel gas.

The HCN containing solution from is pumped through a bed of anion exchange resin that has been treated with counter ions, for example, chloride ions.

The cyanide displaces chloride on the resin according to the following equilibrium reactions:

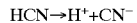

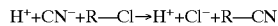

Although the reaction is an equilibrium and hydrogen cyanide is an extremely weak acid, the ion exchange operation proceeds as a result of the effect of column operation, as known in the art. In the case of an NaCl elutant, HCl is formed. The effluent hydrochloric acid co-product can then be further processed, as desired, including concentration using standard HCl production practice. The resin is normally rinsed and drained in the resin wash/entrainment region. Normally, the rinse solution is returned and mixed with the cyanide loading feed.

The cyanide is eluted from the anion resin as described above in the two-step process using anion exchangers.

Example Process: Single Step Process Using Anion Exchangers

Figure 8:
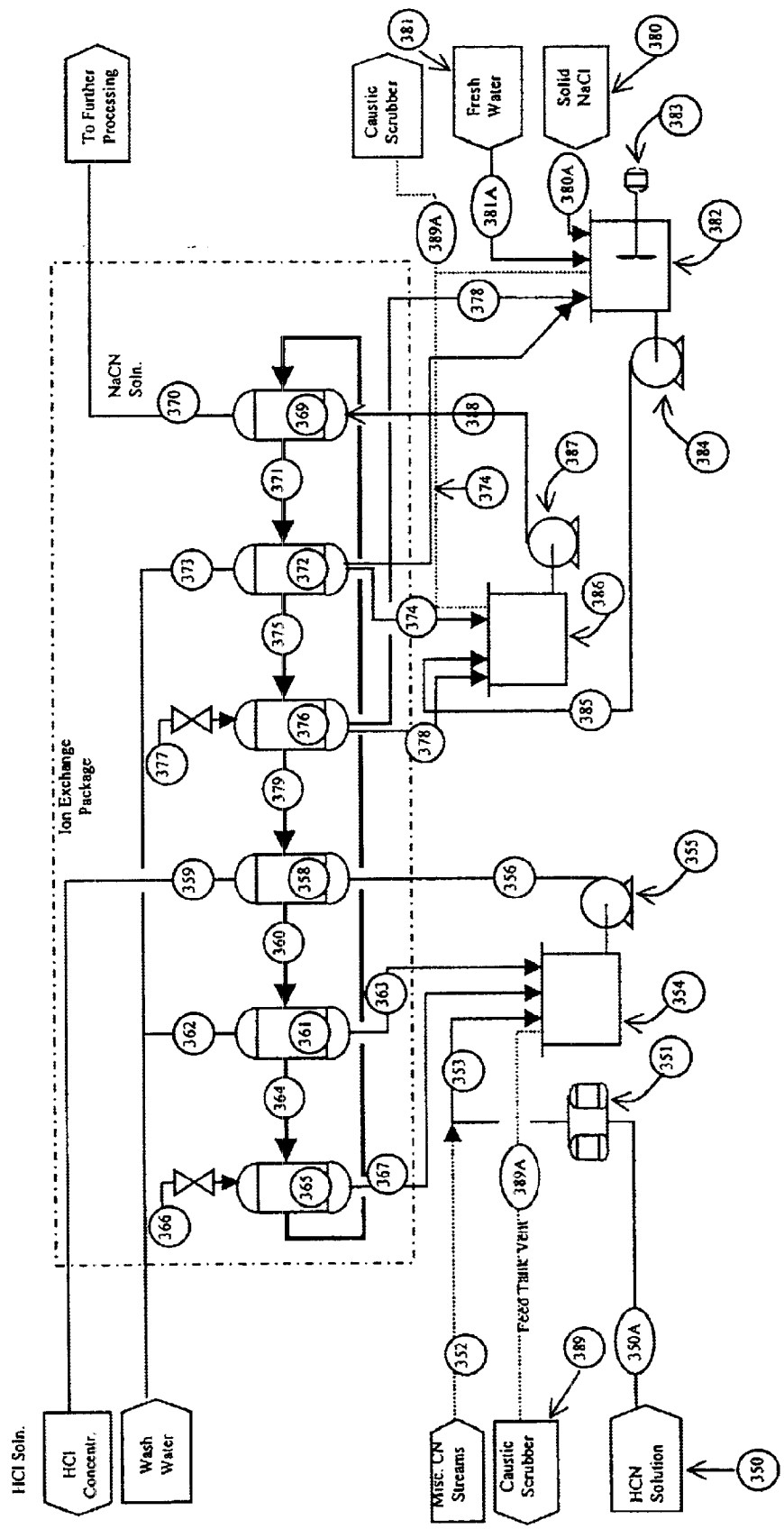
FIG. 8 is an embodiment of the One-Step Process using Simulated Moving Bed (SMB) ion exchange equipment using Anion Exchangers.

The Single Step method of this invention for production of NaCN converts dilute to strong solutions of HCN to NaCN. Refer to the process flow diagram in FIG. 8.

The process will accept hydrogen cyanide from any source, as described above.

A. Solution Preparation

The HCN feed solution (350) may be prepared in any of a number of ways as known in the art. Normally, the solution will be transferred to clarifier 351 via conduit 350A prior to introduction to the ion exchange apparatus (353) to remove insoluble material that may be present as a result of the solution preparation.

The solution is placed in the HCN Feed Tank (354) via conduit 353 where it may be mixed with other miscellaneous cyanide containing streams via conduits (352, 363, and 367). Normally, due to the volatility of hydrogen cyanide, all tanks in this process will be vented via conduit (389A) to a caustic scrubber (389) where any fugitive HCN vapors will be converted to NaCN.

B. Ion Exchange

The process described herein relates to the use of anion exchangers. Anion exchangers are preferred since dilute solutions of cyanide (anions) can be concentrated by absorption onto a resin and then eluted with a concentrated elutant. The cation resin process is described elsewhere.

Hydrogen cyanide is a weak acid and is soluble in water. Both strong-base and weak-base anion resins are capable of neutralizing this weak acid by the following reaction:

$$HCN + R\text{—}Cl \rightarrow R\text{—}CN + HCl \tag{12}$$

Feed solution is pumped to the Ion Exchange Package via conduit 356, by the HCN Feed Pump (355). The system depicted is generic. Any number of commercially available or custom systems may be used. The preferred embodiment utilizes a simulated moving bed (SMB) system.

The features of the illustrated embodiment include:
a. A Cyanide Loading (CN Absorption) Section
b. An Elution Section (CN Desorption)
c. The feed and elutant solutions flow counter-currently to the net resin flow.
d. There are multiple stages of resin beds for both absorption and elution.

Entrainment rejection of the resin bed void solution and washing, although not essential to the method of this invention, are part of the preferred design and are included in this description.

The following steps describe the Ion Exchange operation within the process.

1. Loading (CN Absorption)

The loading section normally consists of one or more stages of resin beds (358) which can be advanced in a direction opposite to the feed solution flow. Feed solution is introduced to the "lead" column or resin bed via conduit 356. Fresh resin is introduced to the "Tail" column via transfer 379 and is normally contacted with solution which is about to leave the column via conduit (359).

Regenerated resin is normally in the chloride-form and converted to the cyano-form by contacting the "Lead" resin bed with feed solution via conduit (356) by the following:

$$R\text{—}Cl + HCN \rightarrow R\text{—}CN + HCl \tag{9}$$

At the tail end of the advancing resin, regenerated, chloride-form resin enters the loading section and comes in contact with the exiting, displaced chloride ions:

$$R\text{—}Cl + HCl \rightarrow R\text{—}Cl + HCl \tag{10}$$

In the middle columns of the loading section, a small amount of cyanide is desorbed and replaced by chloride:

$$R\text{—}CN + HCl \rightarrow R\text{—}Cl + HCN \tag{11}$$

Since fresh, regenerated resin enters the loading section at the point of exit for the feed solution, equations (9) and (10) prevail.

At the lead column, the most concentrated hydrogen cyanide solution contacts resin with the lowest concentration of available resin sites (i.e., R—Cl). Since solutes are continuously removed from the advancing bed and fresh cyanide solution is continuously introduced, the equilibrium of Reaction (11) is forced toward the products (i.e. R—CN).

Loaded resin in the lead column is the least affected since there are essentially no chloride sites remaining to exchange with the pure cyanide solution. That is, Reaction (12), in which nothing happens, predominates.

$$R\text{—}CN + HCN \rightarrow R\text{—}CN + HCN \tag{12}$$

At the Tail column of the Loading Section, depleted solution, containing both cyanide and (desorbed) chloride ions, enters the bed which is substantially in the chloride-form. Reaction (10), in which nothing essentially happens, and Reaction (9) both occur. Because of the high concentration of available of R—Cl, (9) is favored.

Cyanide can break-through according to Reaction (11). The concentration of the cyanide break-through can be made as small as desired adjusting:
a. Feed solution flow
b. Feed solution concentration
c. Resin advance rate
d. Length (volume) of Loading Section as known in the art.

A suitable oxidant may be added to the HCl effluent from the Loading Section to convert any break-through cyanide ions to relatively harmless hydrogen cyanate.

2. Loaded Resin Wash

The resin leaving the loading section normally enters the Loaded Resin Wash Section (361) via transfer 360 and carries with it solution that has substantially the same composition as the feed solution (i.e., HCN). Therefore, this liquor should be routed via conduit (363) back to the HCN Feed Tank (354). Wash water transferred via conduit (362) displaces the resin interstitial fluid and allows for pore diffusion washing to occur.

The fresh wash water transferred via conduit (362) will generally wash the resin flowing in a direction counter-current to the feed solution flow. The purpose of this wash is to displace the interstitial feed solution from the resin bed and allow the pore contained feed solutes to diffuse out of the resin.

The mechanism for the wash step is both displacement (i.e., the interstitial solution) and diffusional (i.e., the pore-contained liquor) and therefore, the wash ratio will normally be purposefully small. Sufficient time for diffusion of the solutes out of the resin should be given to provide acceptable purity in the final product with respect to HCN content. Displacement washing is accomplished by simply pumping fresh water through the bed at a rate sufficient to displace the solution in the bed voids. Pore contained solution removal is time dependent upon concentration gradient between the pore contained solution, the diffusion coefficient, bead diameter, and bead density.

Low flow counter current wash water, on the order of 1–3 bed-volumes of resin per bed-volume of resin advanced should be sufficient. The length of the wash zone is dictated by the requirements to remove pore solution, which are generally small.

3. Loaded Resin Drain

The resin is optionally transferred via transfer (364) to the Loaded Resin Drain section (365) of the ion exchange equipment. Solution is drained via conduit (367) from the resin bed to rid it of the diluted interstitial feed liquor by admitting air or inert gas via vent (366) into the top of the drain column. Since this solution normally contains a small amount of HCN, it also is routed back to the feed tank (354). The resin is then advanced via transfer (368) to the Cyanide Elution Section (369) of the ion exchange apparatus.

4. Elution

Cyanide on the loaded resin is eluted using a strong solution of sodium chloride.

Solid sodium chloride (380) is mixed with fresh water (381) via conduits 380A and 381A and/or Elution Wash Liquor via conduit (378) in the Elutant Mix Tank (382) with mixer 383 to make a concentrated elutant. The NaCl can be any concentration up to saturation.

The elutant is pumped to the Elutant Feed Tank (386) by the Elutant Mix Pump (384) via conduit 385. Elutant is fed counter-current to the net flow of resin by the Elutant Feed Pump (387) via conduit 388.

The resin reaction of interest is Reaction (6) which can be written:

$$R\text{—}CN + NaCl \rightarrow R\text{—}Cl + NaCN \tag{6}$$

Similar to Cyanide Loading, the elution should be operated with solution flowing counter-current to the advance of resin. Because the highest concentration chloride solution contacts the resin which is most regenerated, the resin leaving the elution section will be, for all practical purposes, in the chloride form.

Sodium cyanide solution leaving the Elution Section of the Ion Exchange Unit via conduit (370) can be made as pure as desired using processes known in the art. HCN may be present in the eluate and may be converted to NaCN by adding a small amount of NaOH or other suitable base upon exiting the ion exchange column.

5. Eluted Resin Wash

The eluted resin wash operation has goals similar to that of the "Loaded Resin Wash" operation. Resin leaving the Elution Section via transfer (371) will enter the Wash Zone (372) where wash water via conduit (373) will normally be introduced in the direction opposite of the elutant.

The wash solution consists primarily of NaCl elutant and is directed via conduit (374) back to the Elutant Feed Tank (386) or the Elutant Mix Tank (382). The resin is then advanced via transfer (375) to the Resin Drain Section (376) of the ion exchange equipment.

6. Eluted Resin Drain

Before advancing via transfer (379) to the Resin Loading section (358) of the ion exchange plant, the resin is drained of the wash liquor. The drain liquor is routed back to either the Elutant Feed Tank or the Elutant Mix Tank via conduit 378. The resin drain will normally be facilitated by gravity by admitting air or inert gas via valve (377) to the top of the column.

The effluent Sodium Cyanide may be directed via conduit (370) for further processing and Calcium Chloride may be directed via conduit (373) for further processing steps as desired.

IV. Single Step Using Cation Exchangers to Directly Metathesize HCN

Figure 4:
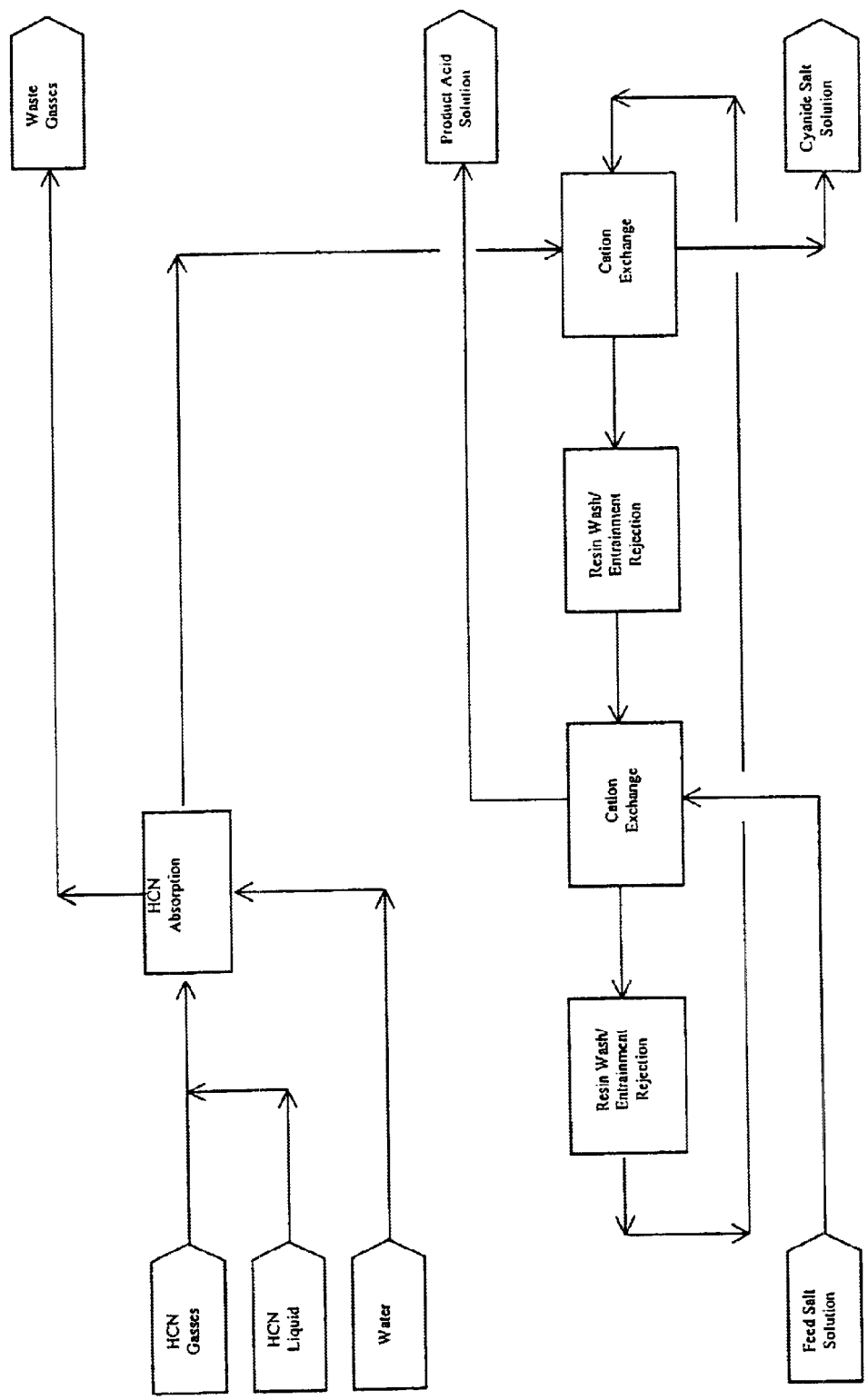
FIG. 4 is a flow chart showing one embodiment of the Single Stage Process Using Cation Exchangers.

FIG. 4 shows a flow chart that describes the general method of the invention.

The absorption of HCN onto a cation resin for this embodiment is identical to that described in the Two-Step Process Using Cation Exchangers above. The hydrogen cyanide may be absorbed or mixed with water (preferably as much as possible, limited by the solubility at the temperature and pressure at which the process is taking place) which is transferred in some standard absorption/mixing device. The HCN solution is transferred to the ion exchange equipment. The HCN-stripped gasses are usually vented, flared, or used as a fuel gas, depending upon the needs of the process plant.

A cation exchange media is prepared by contacting it with a solution of some cationic species such that the counter anion is absorbed onto the exchanger's functionality. It is preferred that sodium chloride is used to supply sodium cation to absorb onto the resin's exchange functionality. The salt is not limited to NaCl. Any suitable anion that can be absorbed by the resin may be used for the process. For example, any of the base-metal halides could be used, including, NaX, KX, LiX, where X is Cl, F, Br, or I. The resin may be rinsed with fresh water and drained if desired before transferring to the cation exchange region. The HCN containing solution from above is introduced to the resin and hydrogen ions displace sodium ions from the resin and a sodium cyanide effluent solution leaves the bed according to the following ion exchange equilibrium:

$$HCN \rightarrow H^+ + CN^-$$

$$H^+ + CN^- + R\text{—}Na \rightarrow Na^+ + CN^- + R\text{—}H$$

The resin will be loaded with hydrogen ions when the counter ions (e.g., sodium are depleted).

After the washed and drained resin has been depleted of sodium and replaced with protons, the resin is regenerated with a solution of sodium chloride. Sodium ions displace hydrogen according to the following ion exchange equilibrium:

$$Na^+ + Cl^- + R\text{—}H \rightarrow H^+ + Cl^- + R\text{—}Na$$

The resin may be washed with fresh water and then drained of solution before being advanced to the Cationic Counterion Absorption section of the ion exchange equipment.

A solution containing a preferred salt is then passed over the resin. The cation displaces the resin absorbed protons resulting in an effluent which consists of an acidic solution. The resin is normally rinsed with fresh water and drained in the resin wash/entrainment rejection section before it returns to the cation exchange section.

Example Process: Single Step Process Using Cation Exchangers

Figure 9:
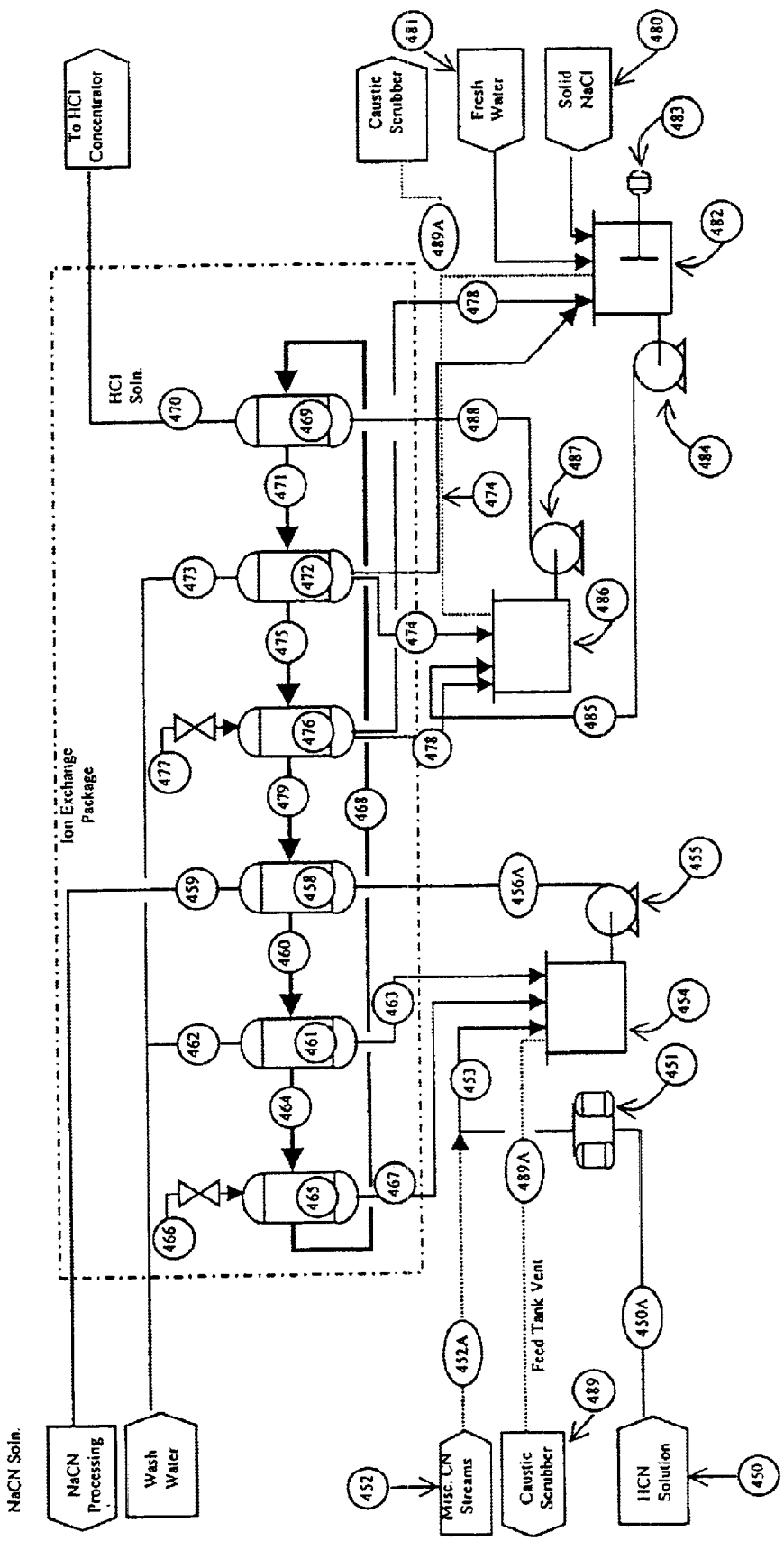
FIG. 9 is an embodiment of the One-Step Process using Simulated Moving Bed (SMB) ion exchange equipment using Cation Exchangers.

This Single Step example embodiment of the method of this invention utilizes cation exchange media for production of NaCN and produces an acidic byproduct, normally an HCl solution. Refer to the process flow diagram in FIG. 9.

Similar to the process described above, this process will accept hydrogen cyanide from any source.

The single step process consists of absorption of hydrogen ions from a hydrogen cyanide solution on a cation exchange resin and subsequent elution using a sodium chloride elutant. The process is described in general terms below.

A. Solution Preparation

The HCN feed solution (450) may be prepared in any of a number of absorption/mixing devices known to one of ordinary skill in the art. Normally, the solution is transferred via conduit 450A to clarification tank (451) prior to introduction to the ion exchange apparatus via conduit (453).

The solution is placed in the HCN Feed Tank (454) where it may be mixed with other miscellaneous cyanide containing streams (via conduits 452A, 463, and 467). Normally, due to the volatility of hydrogen cyanide, all tanks in this process will be vented via conduit (489A) to a caustic scrubber 489 where any fugitive HCN vapors will be converted to NaCN.

B. Ion Exchange

The process described herein relates to the use of cation exchangers. Cation exchangers will allow for a byproduct acid to be produced.

Hydrogen cyanide is a weak acid and is soluble in water. Both strong-acid and weak acid cation exchangers are capable of neutralizing this weak acid by the following reaction:

$$HCN + R\text{—}Na \rightarrow R\text{—}H + NaCN \tag{13}$$

Feed solution is pumped to the Ion Exchange Package via conduit 456A, by the HCN Feed Pump (455). The system depicted is generic. Any number of commercially available or custom systems may be used. Generally, the preferred package will utilize a simulated moving bed (SMB) system.

Features of the illustrated embodiment include:
a. A Proton Loading (H+ Absorption) Section Producing an NaCN Product Effluent
b. An Elution Section (Desorption) Producing an HCl Solution Effluent
c. The feed and elutant solutions flow counter-currently to the net resin flow.
d. There are multiple stages of resin beds for both absorption and elution.

Entrainment rejection of the resin bed void solution and washing, although not essential to the method of this invention, are part of the preferred design and are included in this description.

The following steps describe the Ion Exchange operation within the process.

1. Loading (Proton Absorption and NaCN Production)

The proton loading section normally consists of one or more stages of resin beds (458) which can be advanced in a direction opposite to the feed solution flow. Feed solution is introduced to the "lead" column or resin bed via conduit 456. Fresh resin is introduced via transfer (479) to the "Tail" column and is normally contacted with solution that is about to leave the column via conduit (459).

Regenerated resin shall normally be in the sodium-form and converted to the hydrogen-form by contacting the "Lead" resin bed with feed solution (456) by the following:

$$R\text{—}Na + HCN \rightarrow R\text{—}H + NaCN \tag{14}$$

At the tail end of the advancing resin, regenerated, sodium-form resin will enter the loading section and come in contact with the exiting, displaced sodium ions:

$$R\text{—}Na + NaCN \rightarrow R\text{—}Na + NaCN \tag{15}$$

In the middle columns of the loading section, a small amount of hydrogen ions might be desorbed and replaced by sodium:

$$R\text{—}H + Na^+ + CN^- \rightarrow R\text{—}Na + HCN \tag{16}$$

Since fresh, regenerated resin enters the loading section at the point of exit for the feed solution, equations (14) and (15) prevail.

At the lead column, the most concentrated hydrogen cyanide solution contacts resin with the lowest concentration of available resin sites (i.e., R—Na). Since solutes are continuously removed from the advancing bed and fresh cyanide solution is continuously introduced, the equilibrium of Reaction (14) is forced toward the products (i.e. R—H).

Loaded resin in the lead column is the least affected since there are essentially no proton-loaded sites remaining to exchange with the hydrogen ions in the pure cyanide solution. That is, Reaction (17), in which nothing happens, predominates.

$$R\text{—}H + HCN \rightarrow R\text{—}H + HCN \tag{17}$$

At the Tail column of the Loading Section, HCN depleted solution, containing both cyanide and (desorbed) sodium ions, enters the bed which is substantially in the sodium-form. Reaction (15), in which nothing essentially happens, and Reaction (14) both occur. Because of the high concentration of available of R—Cl, (14) is favored.

Hydrogen cyanide can break-through according to Reaction (16). The concentration of the break-through hydrogen cyanide can be made as small as desired adjusting:
a. Feed solution flow rate
b. Feed solution concentration
c. Resin advance rate
d. Length (volume) of Loading Section Any HCN in the effluent can easily be neutralized using a small quantity of sodium hydroxide to elevate the pH and produce NaCN according to:

$$HCN + NaOH \rightarrow NaCN + H_2O \tag{18}$$

2. Loaded Resin Wash

The resin leaving the loading section via transfer (460) will normally enter the Loaded Resin Wash Section (461) and will carry with it, solution that has substantially the same composition as the feed solution (i.e., HCN). Therefore, this liquor should be routed via conduit (463) back to the HCN Feed Tank (454). Wash water transferred via conduit (462) displaces the resin interstitial fluid and allows for pore diffusion washing to occur.

The fresh wash water will generally wash the resin flowing in a direction counter-current to the feed solution flow. The purpose of this wash is to displace the interstitial feed solution from the resin bed and allow the pore contained feed solutes to diffuse out of the resin.

The mechanism for the wash step is the same as described above.

3. Loaded Resin Drain

The resin is optionally transferred via transfer (464) to the Loaded Resin Drain section (465) of the ion exchange equipment. Solution will be drained via conduit (467) from the resin bed to rid it of the diluted interstitial feed liquor by admitting air or inert gas via vent (466) into the top of the drain column. Since this solution normally contains a small amount of HCN, it also is routed back to the feed tank (454) via conduit 467.

4. Elution

The resin is transferred via conduit 468 to section 469, where protons on the loaded resin are eluted using a strong solution of sodium chloride.

Solid sodium chloride (480) is mixed with fresh water (481) and/or Elution Wash Liquor which is transferred via conduit (478) in the Elutant Mix Tank (482) to make a concentrated elutant using mixer 483. The NaCl elutant can range from low concentrations to saturated solutions.

The elutant is pumped to the Elutant Feed Tank (486) by the Elutant Mix Pump (484) via conduit 485. Elutant from (486) is fed counter-current to the net flow of resin via conduit 488 by the Elutant Feed Pump (487).

The resin reaction of interest is Reaction (13) which can be written:

$$R\text{—}H + NaCl \rightarrow R\text{—}Na + HCl \tag{13}$$

Similar to Proton Loading, the elution is operated with solution flowing counter-current to the advance of resin. Because the highest concentration sodium solution contacts the resin which is most highly loaded with hydrogen ions, the resin leaving the elution section will be, for all practical purposes, in the sodium form.

Hydrogen chloride solution leaving the Elution Section of the Ion Exchange Unit via conduit (470) can be made as pure as desired.

5. Eluted Resin Wash

The eluted resin wash operation has goals similar to that of the "Loaded Resin Wash" operation. Resin leaving the Elution Section (469) via transfer (471) enters the Wash Zone (472) where wash water will normally be introduced in the direction opposite of the elutant via conduit 473.

The wash solution consists primarily of NaCl elutant and is directed via conduit (474) back to the Elutant Feed Tank (486) or the Elutant Mix Tank (482). The resin is then advanced via transfer (475) to the Resin Drain Section (476) of the ion exchange equipment.

6. Eluted Resin Drain

Before advancing via transfer (479) to the Resin Loading section (458) of the ion exchange plant, the resin will be drained of the wash liquor. The drain liquor is routed back via conduit (478) to either the Elutant Feed Tank or the Elutant Mix Tank. The resin drain will normally be facilitated by gravity by admitting air or inert gas via vent (477) to the top of the column.

The effluent Sodium Cyanide may be transferred via conduit (459) for further processing and Hydrogen Chloride stream may be transferred via conduit (470) for further processing as desired.

EXAMPLES

The anion process was demonstrated by the following examples.

A. Analytical Methods

Cyanide Analysis

Cyanide ions were analyzed using the Alpkem "Perstorp" cyanide analyzer. The Perstorp utilizes EPA Method OIA-1677. This is the currently approved method for cyanide determination found in EPA's Guidelines Establishing Test Procedures for the Analysis of Pollutants under section 304(h) of the Clean Water Act.

The method is divided into two parts: sample pretreatment and cyanide quantification via amperometric detection. In the sample pretreatment step, ligand-exchange reagents ("Perstorp" proprietary) are added to a 100-mL sample. The ligand-exchange reagents displace cyanide ions (CN—) from weak and intermediate strength metallo-cyanide complexes.

In a flow-injection analysis system (details are described in EPA Method OIA-1677), a 200-$\mu$L aliquot of the pretreated sample is injected into the flow injection manifold. The addition of hydrochloric acid converts cyanide ion to hydrogen cyanide (HCN). The hydrogen cyanide diffuses through a membrane into an alkaline receiving solution where it is converted back to cyanide ion (CN—). The amount of cyanide ion in the alkaline receiving solution is measured amperometrically with a silver working electrode, silver/silver chloride reference electrode, and platinum counter electrode at an applied potential of zero volt. The current generated in the cell is proportional to the concentration of cyanide in the original sample, as determined by calibration.

Chloride Analysis

Chloride was analyzed using a Buchler-Cotlove "Chloridimeter". The standard coulombretric titration methods for chloride analysis characterized by the Buchler-Cotlove instrument utilizes a silver electrode and determines the endpoint when the excess silver ions are detected in solution. Unfortunately, cyanide complexes with silver and interferes with the titration. This necessitates that the cyanide be destroyed before the titration. The following reaction developed by Hazen Research (Golden, Colo.) was used therefore used to destroy the cyanide before titration:

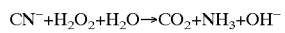

$CN^- + H_2O_2 + H_2O \rightarrow CO_2 + NH_3 + OH^-$

Resin Analysis

The composition of the resin absorbed ions was determined by a standard elution procedure. The procedure consisted of the following:

a. Load a two-milliliter laboratory column with one milliliter of the resin to be analyzed.
b. Pass 250 ml of 50 g/L $H_2SO_4$ through the column and collect in a 500-ml volumetric flask containing approximately 10.7 grams of NaOH. The sulfate-bisulfate ions effectively displace both the cyanide and chloride ion. The caustic soda is required to convert the HCN during elution formed by the elution back to $CN^-$.
c. Rinse the resin with approximately 200 ml of DI water. The total volume was brought up to 500 ml and mixed.
d. The solutions were then analyzed for chloride and cyanide using the procedures outlined above.

It was originally intended that the analytical elution of resin adsorbed species would be carried out using a solution of sodium sulfate ($Na_2SO_4$). The method instead used a dilute solution of sulfuric acid. The presence of significant bisulfate ions in solutions at a pH of 1–2 reduces its effectiveness as an elutant. Nonetheless, from material balances around the method, sulfuric acid appears to perform adequately.

Solution Preparation

Suitably pure reagent-grade calcium cyanide was unavailable for testing, so potassium cyanide was used. In these examples, cyanide concentration was kept low to demonstrate the ability to convert dilute solutions of cyanide to high concentration without evaporation. However, solutions with other cyanide concentrations up to the maximum molar concentration of reactive sites, specific to the particular media used, as known to one of ordinary skill in the art.

Resin Preparation

The ion exchange resin used for this work was Dowex Marathon MSA strong base anion resin. This is a readily available polystyrene-based resin, crosslinked with divinyl benzene and substituted with quaternary ammonium functional groups.

Stocks of resin were used in two forms, one being fully loaded with chloride and one being fully loaded with cyanide. The resin arrives from the manufacturer in the fully chloride loaded form.

To prepare the cyanide form approximately 50 milliliters of resin was loaded into a laboratory ion exchange column. 500 milliliters (10 Bed Volumes (BVs)) of 500 meq/L (26,000 ppm CN) potassium cyanide was prepared at a pH of 12. This solution was pumped though the column at 25 ml/min and was followed by a 300-ml rinse with deionized (DI) water.

B. Selectivity Determination

Resin selectivity is defined as the relative degree of affinity for absorption of an ion on a resin to some standard ion. For anion exchangers (such as the Dowex MSA used in this study) the generally accepted standard is the $OH^-$ ion which is assigned a selectivity of 1.0. Resin selectivity can be expressed as an equilibrium constant:

$$K_{Cl:CN} = [R{-}CN][Cl^-]/[R{-}Cl][CN^-]$$

where [R—CN] and [R—Cl] refer to the concentrations of CN and Cl in the resin phase. The selectivity of the resin was determined in two tests. In the first test, a single milliliter of hydroxide form resin was placed in a stirred beaker of solution containing known quantities of sodium cyanide and sodium chloride. The resin was allowed to come to chemical equilibrium over the course of an hour. The amount of cyanide and chloride was in large excess of the total exchange capacity of the resin. The experimentally determined selectivity from the two tests is shown in Table 1.

TABLE 1

| Test I.D. | $K_{(Cl/CN)}$ |
|---|---|
| 2715-90-1 | 0.88775 |
| 2715-90-3 | 0.76572 |

$K_{(Cl/CN)}$ is the selectivity of chloride as compared to cyanide.

The literature values for strong base quaternary ammonium, Type I anion exchange resin (relative to hydroxide) are: (Ion Exchange Chemistry on a Solid Matrix, R. T. Mulligan, and Dow Chemical Canada, Inc.)
K(Cl—)=22
K(CN—)=28
$K_{(Cl—)}/K_{(CN—)}$=0.7857.

The value from Test 2715-90-3 closely matches the ratio of $K_{(Cl—)}/K_{(CN—)}$ derived from literature values. Subsequent other CN—Cl loading and elution testing in resin columns indicates that this may be the more reliable of the two tests.

The resin was found to favor the loading of cyanide over chloride, although the affinity appears to be similar. The disagreement between the two tests with regard to affinity, while not large, should be addressed with future testing.

C. Resin Loading/Elution Kinetics (Small Column)

The objective of the small column loading and elution tests was to quickly determine in a set of very quick, simple tests, the ion exchange kinetics of the process. The results of these tests could quickly give an indication of the resin capacity and the rate of absorption/elution of the ionic species as a function of concentration. In addition, the results are useful in estimating the required experimental conditions for the more involved tests that were performed later in this study.

For these tests, a single milliliter of either chloride-form or cyanide form resin was loaded into a 2-ml resin column and treated with a solution of the appropriate counter ion. Solution was passed through the column at a rate such that the effluent concentration of cyanide was not considerably different than the influent concentration measured by calibrating a peristaltic pump. The purpose was to enable determination of the kinetic constant which depends upon:
Bead Size
Solute Concentration
Diffusion Coefficient
Bead Density Three tests were performed using 150, 300, and 900 ml/min with 0.02-M solutions of either chloride solution for the treatment of cyanide resin or cyanide solution for the treatment of chloride resin. Details of the tests are given below:

TABLE 2

"Small Column" Data and results
Chloride Loading onto Cyanide Form Resin

| | | Test 1 | Test 2 | Test 3 |
|---|---|---|---|---|
| Chloride Loading | | | | |
| Loading Solution Properties | | | | |
| Molar Cl Concentration | meq/ml | 0.02 | 0.02 | 0.02 |
| Mass Cl Concentration | ppm | 709 | 709 | 709 |
| Loading Solution Flow | ml/min | 300 | 300 | 300 |

TABLE 2-continued

"Small Column" Data and results
Chloride Loading onto Cyanide Form Resin

| | | Test 1 | Test 2 | Test 3 |
|---|---|---|---|---|
| Tot. Solution Thru Column | ml | 150 | 300 | 900 |
| Total Cl Fed to Column | mg | 106.35 | 212.7 | 638.1 |
| Resin Properties | | | | |
| Resin Volume | ml | 1.00 | 1.00 | 1.00 |
| Resin Capacity | meq/ml | 0.93 | 0.98 | 0.99 |
| Total Resin Capacity | mg | 32.8 | 34.6 | 35.2 |
| Elution Data | | | | |
| Solution Volume | ml | 500 | 500 | 500 |
| Solution Analysis | ppm | 40 | 55 | 70 |
| Total Eluted Chloride | mg | 20 | 27.5 | 35 |
| Percent Resin Loading | | 60.9% | 79.5% | 99.4% |
| Kinetic Coefficient Determination | | | | |
| Time | min | 0.5 | 1 | 3 |
| f(X) for Pore Diffusion | | 0.178 | 0.367 | 0.911 |
| f(X) for Reaction Limited | | 0.269 | 0.410 | 0.816 |
| τ(diffusion) | min | 2.811 | 2.728 | 3.292 |
| τ(film) | min | 0.821 | 1.258 | 3.019 |
| τ(reaction) | min | 1.860 | 2.439 | 3.675 |

Tau at the bottom of this table is the estimated time to load the resin to load to 100% given the rate limiting assumption used for a particular kinetic assumption. Time, t, is the time it takes for a resin to reach conversion X. The expression for tau is somewhat different for each model, but for the most part, all dependent upon bead size, solute concentration, diffusion coefficient, and density of the resin bead.

$$t=\tau(1-3(1-X)^{2/3}+2(1-X)) \quad \text{(Pore Diffuision Model)}$$

$$t=\tau X \quad \text{(Film Diffusion Model)}$$

$$t=\tau(1-(1-X)^{1/3}) \quad \text{(Reaction Rate Limited Model)}$$

By examining calculated tau for each of the models, it can be seen that the pore diffusion assumption is constant for two different tests and predicts a 100% loading time of about 2.75 minutes. The last test (3 minutes in duration) is longer than the 100% loading time, so its value of tau is spurious.

For more information on these models, consult "Reaction Engineering" by Octave Levenspiel, $2^{nd}$ Ed., 1972, which is hereby incorporated by reference to the extent not inconsistent with the disclosure herein.

TABLE 3

"Small Column" Data and Results
Cyanide Loading onto Chloride Form Resin

| | | Test 1 | Test 2 | Test 3 |
|---|---|---|---|---|
| Cyanide Loading | | | | |
| Loading Solution Properties | | | | |
| Molar CN Concentration | meq/ml | 0.02 | 0.02 | 0.02 |
| Mass CN Concentration | ppm | 520.4 | 520.4 | 520.4 |
| Loading Solution Flow | ml/min | 300 | 300 | 300 |
| Tot. Solution Thru Column | ml | 150 | 300 | 900 |
| Total CN Fed to Column | mg | 78.06 | 156.12 | 468.36 |
| Resin Properties | | | | |
| Resin Volume | ml | 1 | 1 | 1 |
| Resin Capacity | meq/ml | 0.89 | 0.96 | 0.90 |
| Total Resin Capacity | mg | 23.06 | 25.00 | 23.50 |

TABLE 3-continued

"Small Column" Data and Results
Cyanide Loading onto Chloride Form Resin

|  |  | Test 1 | Test 2 | Test 3 |
|---|---|---|---|---|
| Elution Data |  |  |  |  |
| Solution Volume | ml | 500 | 500 | 500 |
| Solution Analysis | ppm | 29.24 | 47.79 | 46.99 |
| Total Eluted Cyanide | mg | 14.62 | 23.895 | 23.495 |
| Percent Resin Loading |  | 63.4% | 95.6% | 100.0% |
| Kinetic Coefficient Determination |  |  |  |  |
| Time | min | 0.5 | 1 | 3 |
| f(X) for Pore Diffusion |  | 0.197 | 0.714 | 1.000 |
| f(X) for Reaction Limited |  | 0.285 | 0.647 | 1.000 |
| τ(diffusion) |  | 2.538 | 1.401 | 3.000 |
| τ(film) |  | 0.789 | 1.046 | 3.000 |
| τ(reaction) |  | 1.756 | 1.546 | 3.000 |

In Table 3, the results show that with only a 520 ppm (0.02 M) feed solution of cyanide, a chloride form resin is nearly 100% converted to the cyano form in about one minute. The kinetics appear to be reaction rate limited, but not enough data was taken to rule out pore diffusion as the limiting case. As solute concentration increases, pore diffusion is generally the rate limiting factor.

The calculated values of tau show a somewhat unexpected result. The "reaction limited" model shows that the resin should load to 100% completion in about 1.55 to 1.75 minutes. Again the third test, at 3 minutes in duration, is clearly longer than the time to load to completion, and is, again, spurious. Because the resin loaded so quickly, relative to the test conditions, it is difficult to determine whether the true mechanism is either "reaction limited" or "pore diffusion limited". To resolve this question, the test should be performed at a higher flow rate (shorter contact time).

The small column tests using a single milliliter of resin indicated that pore diffusion was the rate limiting mechanism for elution of cyanide with chloride. And although for the loading of cyanide onto chloride resin, reaction rate was indicated as the limiting mechanism, it is possible that the true mechanism is also pore diffusion.

Presuming pore diffusion kinetics are the rule, the rate of loading and elution are proportional to the concentration and inversely proportional to the square of the bead diameter. So, the loading/elution rates can be doubled by doubling the concentration and quadrupled by cutting the bead size in half.

D. Break-Through Curve

Two "Break-Through" tests were performed. The experiment consisted of a single test for each:

Chloride loading onto a cyanide resin
Cyanide loading onto a chloride

For these tests, 50 ml of cyanide-form resin or chloride resin was loaded into a 15-mm diameter laboratory column. This gave a resin height of 25.5 cm. Approximately 25 bed volumes of a 0.1 M solution of solute was passed through the column at 0.5 bed volumes (BV) per minute. The total solute passed through the column was 2.5 times the total capacity of the resin.

Figure 10:
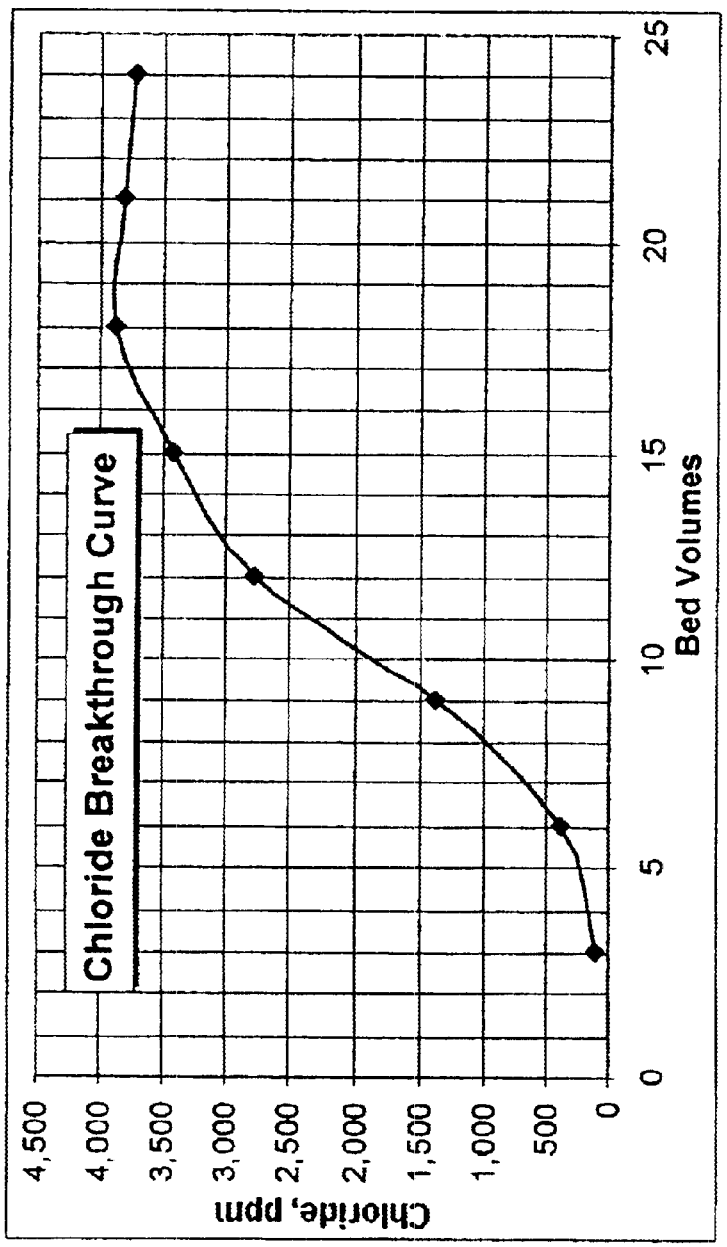
FIG. 10 shows a chloride breakthrough curve.
Figure 11:
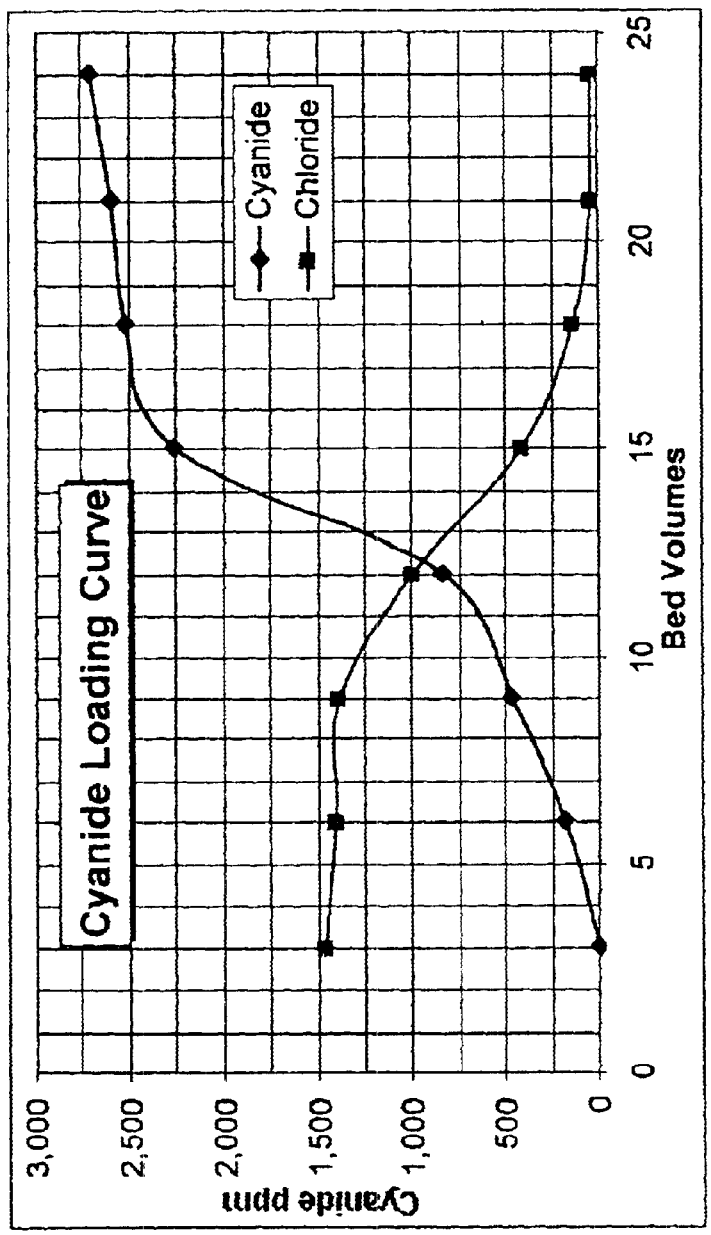
FIG. 11 shows a cyanide loading curve.

The effluent was collected in one bed-volume aliquots and analyzed for both chloride and cyanide. Plots solute break-through are presented in FIGS. 10 (Chloride Break-Through) and 11 (Cyanide Break-Through). The procedure used for chloride onto cyanide resin is presented below. The procedure for cyanide loading is identical except for the solute and resin form.

1. The Resin Column

Fill a 12.7-mm diameter ion exchange column with 50 ml of cyanide form ion exchange resin. This should be about 16 inches of resin.

| Column Properties | |
|---|---|
| Column Diameter | 15 mm |
| Resin Volume | 45 ml |
| Resin Height | 25.5 cm |

This quantity of resin has a total capacity of about 55 meq. The resin bed should contain only deionized water to eliminate uncontrolled variables.

| Resin Properties | |
|---|---|
| Resin Activity | 1.1 meq/ml |
| Total Resin Capacity | 55 meq |

2. The Loading Solution

Prepare 1250 ml of NaCl solution (25 bed volumes, BV's) according to the following recipe:

a. To a suitable beaker, add enough caustic solution to make the feed solution 0.01 M NaOH. One way is by adding 12.5 ml of 1.0 M NaOH b. Add 8.035 grams of NaCl (100% basis) (this is about 137.5 meq of chloride ion or 2.5 times the total capacity of the resin in the column)

3. Pumping Solution Through the Column

The table below defines both the solution preparation and the test conditions:

| Solution Preparation and Test Conditions | | | |
|---|---|---|---|
| Flow Rate | 0.5 BV/min = | 25 ml/min | |
| Total Solution | 25 BV = | 1250 ml | |
| Qty Cl in Soln per BV | 10% of Total Resin Capacity | | |
| NaCl Req'd (100% Basis) | 8.035 grams = | 4.874 (as Cl) | |
| Concentration | 0.64% NaCl | 0.39% (as Cl) | |
| Molar Concentration | 0.0987 M | | | a. In a 1.5-liter beaker, add 1,250 ml of water, 8.035 grams of NaCl (dry 100% basis), and 12.5 ml of 1M NaOH (to bring the pH up to 12.0).

b. Pass the solution through the column at 25 ml/minute. This means the test will last about 50 minutes. The first 20-ml of solution displaces the fresh water contained in the resin bed. Therefore, collect the first 20-ml as "Sample 0".

c. The following is the sample schedule for the test:

| NaCN Elution Sample Schedule | | | |
|---|---|---|---|
|  | Cumulative Solution (ml) | Total Cl- Added (meq) | % of Cap Added |
| 1 | 250 | 27.5 | 50% |
| 2 | 375 | 41.25 | 75% |
| 3 | 450 | 49.5 | 90% |
| 4 | 500 | 55 | 100% |

-continued

NaCN Elution Sample Schedule

| | Cumulative Solution (ml) | Total Cl- Added (meq) | % of Cap Added |
|---|---|---|---|
| 5 | 550 | 60.5 | 110% |
| 6 | 600 | 66 | 120% |
| 7 | 650 | 71.5 | 130% |
| 8 | 750 | 82.5 | 150% |
| 9 | 900 | 99 | 180% |
| 10 | 1250 | 137.5 | 250% | i. After "Sample 0" (S0) is taken, collect the first 225 ml of solution. Keep a ~25 ml sample of it (with no plans for analysis)

ii. Take a 50-ml sample from 225 to 275 ml of cumulative solution through the column. Designate it "S1-250 ml".

The 375 ml sample is taken from cumulative 350 ml to 400 ml and is designated "S2-375 ml".

iii. Solutions which are collected between samples may be kept and designated, for example, as "S2.5", meaning that the came between the 375 ml and the 450 ml sample.

iv. "Sample 10" (S10-1250 ml) is taken from cumulative 1200 to 1250 ml of solution.

4. Analysis

Analyze samples S1 through S10 for cyanide and chloride.

E. Simulated Operation

A single additional run was made to roughly simulate counter-current column operation of the ion exchange portion of the disclosed process. A detailed description of the procedure can be found below.

For this test, 200 ml of chloride form resin (about 200–220 meq of resin active sites) was placed in a laboratory resin column. The height of the resin bed was 28 inches. A 250 ml solution containing 175 meq of potassium cyanide was passed downward through the column at a rate of 25 ml/min. The solution was followed by 200 ml of deionized wash water. Samples were collected at 25 ml intervals. After the loading with cyanide was complete, the column flow reversed (to up-flow mode) and 50 ml of an elutant containing 150 meq of NaCl was passed through the column at a rate of 50 ml/min. After elution, the column was rinsed with 160 ml of wash water. Samples were taken at 10 ml intervals. The column was then drained and the solution was collected.

The following describes the specific process used:

Simulated CN Loading with Chloride Elution Process

1) Start with:
   200 ml of Cl- form Resin
   Voids are about 40% (or about 80 mls)
2) Prepare in a Vol Flask:
   175 meq CN which is 11.395 grams (KCN)
   250 ml total Vol (with H2O)=0.70 meq/ml
   2.5 ml 1.0 MNaOH (for pH 12)=18,216 ppm (CN)
3) Pass the loading solution through the column at:
   25 ml/min
   1 sample per minute for
   10 samples (Analyze for cyanide and chloride)
4) Follow (same flow direction) with water
   200 ml H2O
   25 ml/min
   1 sample/min
   8 samples (Analyze for cyanide and chloride)
5) Prepare NaCl Elutant:
   150 meq =5317.5 mg Cl— =8.766 grams (NaCl)
   0.5 ml 1.0 M NaOH=3 meq/ml
   50 ml total volume
   Solution=17.5% NaCl
6) Pump elutant through at:
   10 ml/min
   1 sample/min
   10 ml samples (Analyze for cyanide and chloride)
7) Follow Elutant with
   160 ml Wash Water
   10 ml/min
   1 sample/min
   10 ml samples (Analyze for cyanide and chloride)

Notes:

1) Use the previous test to determine dilutions for cyanide using standard wet chemical methods. The CN should come out at the same place in the test.

For example, 1,000:1 dilutions for L0 to LW2 (L=loading phase and numbers indicate samples).

Use 5,000 or 10,000:1 dilutions for E1 to EW10 (E=elution phase and numbers indicate samples).

Do dilutions of samples for CN the same day as analysis to avoid CN decomposition Table 6 below lists a summary of the results of the test.

TABLE 6

Simulation Results

| Max Conc. of NaCN | 9.1% | wt. % |
|---|---|---|
| Max Effluent Molar NaCN Conc. | 1.85 | meq/ml |
| Feed NaCl Conc. | 3.00 | meq/ml |
| % Dilution | 38.2% | |

The observed maximum concentration of NaCN leaving the column during elution with NaCl was close to that of the theoretical maximum of about 10.8%. Higher concentrations are achievable when resins with higher activity are used.

Dow Chemical currently is capable of producing a resin with similar physical properties to the one used except for a capacity which exceeds 1.5 equivalents per liter. If such a resin were successfully implemented, the concentration of NaCN leaving the ion exchange could exceed 15 weight percent.

The selectivity testing was limited in this program and a more rigorous approach is suggested in future work. It is also suggested that other resins, including gel-type, be tested (as well as with Dowex MSA) to determine the optimal resin.

It is currently assumed that a resin with essentially equivalent selectivity would be ideal. The reason is that during cyanide loading, cyanide leakage in the $Ca(Cl)_2$ product stream would be undesirable due to the toxicity of cyanide. And because Dowex MSA favors absorption of cyanide, elution will require a larger resin inventory to achieve product purity.

The simulation run showed that high concentration of cyanide and low chloride contamination are achievable using counter-current ion exchange methods. The simulation run used only a single 28-inch resin bed with non-optimized operating conditions. In actual practice, it is preferred that the process will be performed in a simulated moving bed ion exchanger with many more theoretical stages of loading. In this work, the column contained roughly 200 meq. of active sites and was intentionally loaded with only 175 meq. of cyanide. This left 25 meq. of chloride on the resin. In actual SMB equipment, only fully loaded cyanide resin would be advanced to washing and elution. In this case, the wash solution would carry only cyanide. The wash solution would be returned to the feed tank.

Although the description above contains many specificities, these should not be construed as limiting the scope of the invention, but as merely providing illustrations of some of the presently preferred embodiments. For example, many chemical substances other than those particularly listed may be used, as long as they perform the same function. Thus, the scope of the invention should be determined by the appended claims and their legal equivalents.

We claim:

1. A method of making a compound selected from the group consisting of: Group IA and IIA cyanide salts comprising:
   (a) contacting hydrogen cyanide with calcium hydroxide or calcium carbonate to produce calcium cyanide; and either
   (b) reacting said calcium cyanide with an ion-exchange media containing a first exchangeable anion so that said cyanide is exchanged with said first exchangeable anion and reacting said media with a solution of a second exchangeable anion and a Group IA or Group IIA metal ion, whereby the second exchangeable anion exchanges with said cyanide, forming a Group IA or Group IIA cyanide solution; or
   (c) reacting said calcium cyanide with an ion-exchange media containing a first exchangeable cation selected from the group consisting of: Group IA and Group IIA metal cations so that said calcium is exchanged with said first exchangeable cation and a Group IA or Group IIA cyanide solution is formed.

2. The method of claim 1, wherein at least an equal molar amount of calcium hydroxide or calcium carbonate as compared to the amount of hydrogen cyanide is used.

3. The method of claim 1, wherein said ion-exchange media is selected from the group consisting of: a solid matrix, a liquid matrix, an ion encapsulation media; an anionic media; a cationic media; and a non-ionic media.

4. The method of claim 1, wherein said method is carried out at an effective temperature for an effective time so that Group IA or IIA cyanide salts are formed.

5. A method of making a Group IA or Group IIA cyanide solution comprising:
   (a) reacting a cyanide gas or Group IA or Group IIA cyanide solution with an at least equal molar amount of calcium hydroxide or calcium carbonate for an effective time and at an effective temperature to produce calcium cyanide;
   (b) reacting said calcium cyanide with an ion-exchange media containing a first exchangeable anion for an effective time and at an effective temperature so that said cyanide is exchanged with said first exchangeable anion;
   (c) reacting said media with a member selected from the group consisting of: Group IA and IIA metals having a second exchangeable anion, whereby the second exchangeable anion exchanges with said cyanide, releasing said cyanide from said media.

6. The method of claim 5, wherein said first exchangeable anion is chloride and the second exchangeable anion is chloride and the Group IA or Group IIA metal is sodium.

7. A method of making a Group IA or Group IIA cyanide solution comprising:
   (a) reacting a cyanide gas or Group IA or Group IIA cyanide solution with an at least equal molar amount of calcium hydroxide or calcium carbonate for an effective time and at an effective temperature to produce calcium cyanide;
   (b) reacting said calcium cyanide with an ion-exchange media containing an exchangeable cation selected from the group consisting of: Group IA and Group IIA metal cations, for an effective time and at an effective temperature so that calcium is exchanged with said exchangeable cation, producing a solution comprising cyanide and said exchangeable cation.

8. The method of claim 7, wherein said exchangeable cation is selected from the group consisting of sodium, potassium and lithium.

9. The method of claim 8, wherein said exchangeable cation is sodium.

10. A method of making a Group IA or Group IIA cyanide solution comprising:
    contacting a cyanide gas or Group IA or Group IIA cyanide solution with a cation exchange media having an exchangeable cation selected from the group consisting of: Group IA and Group IIA elements, for an effective time and at an effective temperature so that hydrogen exchanges with the exchangeable cation, producing a solution comprising cyanide and said exchangeable cation.

11. The method of claim 10, wherein said exchangeable cation is sodium.

12. A method of preparing a Group IA or IIA cyanide salt comprising:
    (a) reacting a hydrogen cyanide gas or solution with an at least equal molar amount of a Group IA or Group IIA metal with an exchangeable ion for an effective time and at an effective temperature to produce a Group IA or Group IIA cyanide;
    (b) reacting said cyanide with an ion-exchange media containing an exchangeable anion selected from the group consisting of: Cl, F, Br, I and formate, for an effective time and at an effective temperature so that said cyanide is exchanged with said exchangeable anion.

13. A method of preparing a Group IA or Group IIA cyanide salt comprising:
    (a) reacting a hydrogen cyanide gas or solution with an at least equal molar amount of a Group IA or Group IIA metal with an exchangeable ion for an effective time and at an effective temperature to produce a Group IA or Group IIA cyanide;
    (b) reacting said Group IA or Group IIA cyanide with an ion-exchange media containing an exchangeable cation selected from the group consisting of: Group IA and Group IIA metals, for an effective time and at an effective temperature so that the Group IA and Group IIA cations exchange.

14. The method of claim 12, wherein said exchangeable anion is chloride.

15. A method of making a sodium cyanide solution, comprising:
    exchanging hydrogen from a reactant hydrogen cyanide gas or solution with calcium from a basic calcium solution, wherein a basic cyanide solution is formed;
    exchanging the cyanide from the basic cyanide solution with chloride from an anion exchange media containing exchangeable chloride;

exchanging the cyanide from the anion exchange media with chloride from a sodium chloride solution, wherein a sodium cyanide solution is formed.

16. A method of making a sodium cyanide solution, comprising:

exchanging calcium from a basic calcium solution with hydrogen from a reactant hydrogen cyanide gas or solution, forming a calcium cyanide solution;

exchanging calcium from the calcium cyanide solution with sodium from an ion exchange media containing exchangeable sodium, wherein a sodium cyanide solution is formed.

17. A method of making a sodium cyanide solution, comprising:

exchanging cyanide from a reactant hydrogen cyanide gas or solution with chloride from an anion exchange media containing exchangeable chloride, forming media having exchangeable cyanide;

exchanging the cyanide from the media having exchangeable cyanide with chloride from a sodium chloride solution by contacting the media having exchangeable cyanide with a sodium chloride solution, wherein a sodium cyanide solution is formed.

18. A method of making a sodium cyanide solution, comprising:

contacting a reactant hydrogen cyanide gas or solution with an ion exchange media containing exchangeable sodium, wherein a sodium cyanide solution is formed by the exchange of the sodium with the hydrogen.

* * * * *